United States Patent
Diken et al.

(10) Patent No.: US 11,800,233 B2
(45) Date of Patent: Oct. 24, 2023

(54) SYSTEM WITH ADAPTIVE LIGHT SOURCE AND NEUROMORPHIC VISION SENSOR

(71) Applicant: Lumileds LLC, San Jose, CA (US)

(72) Inventors: Erkan Diken, Eindhoven (NL); Arjen Gerben Van Der Sijde, Eindhoven (NL); Nicola Bettina Pfeffer, Eindhoven (NL); Wilhelmus Johannes Robertus Van Lier, Eindhoven (NL); Marcus Hendrikus Adrianus van Steen, Eindhoven (NL); Rob Jacques Paul Engelen, Eindhoven (NL)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 17/326,494

(22) Filed: May 21, 2021

(65) Prior Publication Data
US 2022/0377222 A1 Nov. 24, 2022

(51) Int. Cl.
*H04N 23/72* (2023.01)
*H04N 23/56* (2023.01)
*H04N 23/73* (2023.01)
*H04N 23/74* (2023.01)
*H04N 25/47* (2023.01)
*H04N 23/61* (2023.01)
*H04N 23/00* (2023.01)
*H04N 23/741* (2023.01)

(52) U.S. Cl.
CPC .......... *H04N 23/72* (2023.01); *H04N 23/56* (2023.01); *H04N 23/61* (2023.01); *H04N 23/73* (2023.01); *H04N 23/74* (2023.01); *H04N 23/00* (2023.01); *H04N 23/741* (2023.01); *H04N 25/47* (2023.01)

(58) Field of Classification Search
CPC ............. H04N 5/2256; H04N 5/23218; H04N 5/23219; H04N 5/2352–2355; H04N 23/56; H04N 23/61; H04N 23/72–741; H04N 25/47
See application file for complete search history.

(56) References Cited

U.S. PATENT DOCUMENTS

| | | | |
|---|---|---|---|
| 7,800,316 B2 | 9/2010 | Haug | |
| 7,932,875 B2 | 4/2011 | Dallas et al. | |
| 10,089,929 B2 | 10/2018 | Nathan et al. | |
| 10,113,910 B2 | 10/2018 | Brunk et al. | |
| 10,133,944 B2 | 11/2018 | Zink et al. | |
| 2003/0020826 A1 | 1/2003 | Kehtarnavaz et al. | |
| 2010/0092031 A1* | 4/2010 | Bergeron | G06V 10/143 382/103 |

(Continued)

FOREIGN PATENT DOCUMENTS

WO 2019016025 A1 1/2019

OTHER PUBLICATIONS

Martel, et al., "Neural Sensors: Learning Pixel Exposures for HDR Imaging and Video Compressive Sensing With Programmable Sensors" IEEE Transactions on Pattern Analysis and Machine Intelligence, Jul. 1, 2020, vol. 42, Issue 7, 11 pgs.

*Primary Examiner* — Daniel M Pasiewicz

(57) ABSTRACT

An apparatus includes a neuromorphic vision unit, an array, and a controller. The neuromorphic vision unit includes a plurality of pixels to photoelectrically produce data based on light received from an object in a scene. The array includes a plurality of light sources. The controller controls the plurality of light sources at one of a plurality of granularities, at least in part based on the data.

20 Claims, 11 Drawing Sheets

(56) References Cited

U.S. PATENT DOCUMENTS

| | | | |
|---|---|---|---|
| 2013/0162855 A1* | 6/2013 | Kannermark | H04N 5/2353 |
| | | | 348/222.1 |
| 2017/0223337 A1* | 8/2017 | Sung | G01S 7/497 |
| 2018/0182111 A1* | 6/2018 | Shinohara | G03B 15/02 |
| 2019/0384140 A1 | 12/2019 | Schulten et al. | |
| 2020/0252533 A1* | 8/2020 | Movshovich | H04N 5/232 |
| 2021/0058539 A1* | 2/2021 | Van Der Sijde | G01S 17/894 |

* cited by examiner

SYSTEM WITH ADAPTIVE LIGHT SOURCE AND NEUROMORPHIC VISION SENSOR

CROSS-REFERENCE TO RELATED APPLICATIONS

The present application is related to a co-pending application entitled, "ACTIVE MATRIX HYBRID MICROLED DISPLAY," filed on the same day by inventors Rob Van Lier et al. (U.S. application Ser. No. 17/326,531). The entire contents of that application are incorporated by reference herein.

BACKGROUND

Technical Field

This disclosure relates to a system including a light source, such a light emitting diode (LED), supplemented by a neuromorphic vision sensor and, in particular, to such a system that additionally includes a camera.

Related Art

Conventionally, a system with a sensor, such as a camera, reads out frames of data from the sensor at a constant time interval, depending on a desired number of frames per second (fps). The system then transfers the raw sensor data to a computing unit for further processing. Since all of the sensor data is transferred to the output of the sensor, the size of the data causes extra latency, due to bandwidth constraints, and more power consumption in the system.

A neuromorphic vision system is a more advanced system in which a vision sensor aims to mimic the sensing and early processing of the human retina. The vision sensor is equipped with a near-sensor computing unit in the form of an analog and/or digital circuit.

BRIEF SUMMARY

Some implementations of the disclosure concern an apparatus including a neuromorphic vision unit including a plurality of pixels that photoelectrically produce data based on light received from an object in a scene; an array including a plurality of light sources; and a controller that controls the plurality of light sources at one of a plurality of granularities, at least in part based on the data.

In another implementation, a method includes photoelectrically producing data, by a neuromorphic vision unit, based on light received from an object in a scene, the neuromorphic vision unit including a plurality of pixels; and controlling a plurality of light sources of an array at one of a plurality of granularities, at least in part based on the data.

In yet another implementation, a non-transitory, computer-readable storage medium is encoded with instructions that, when executed, cause a processing unit to perform a method including receiving data from an imager unit indicating an object in a scene, the imager unit including a plurality of pixels; and controlling a plurality of light sources of an array at one of a plurality of granularities, at least in part based on the data.

DETAILED DESCRIPTION

Figure 1:
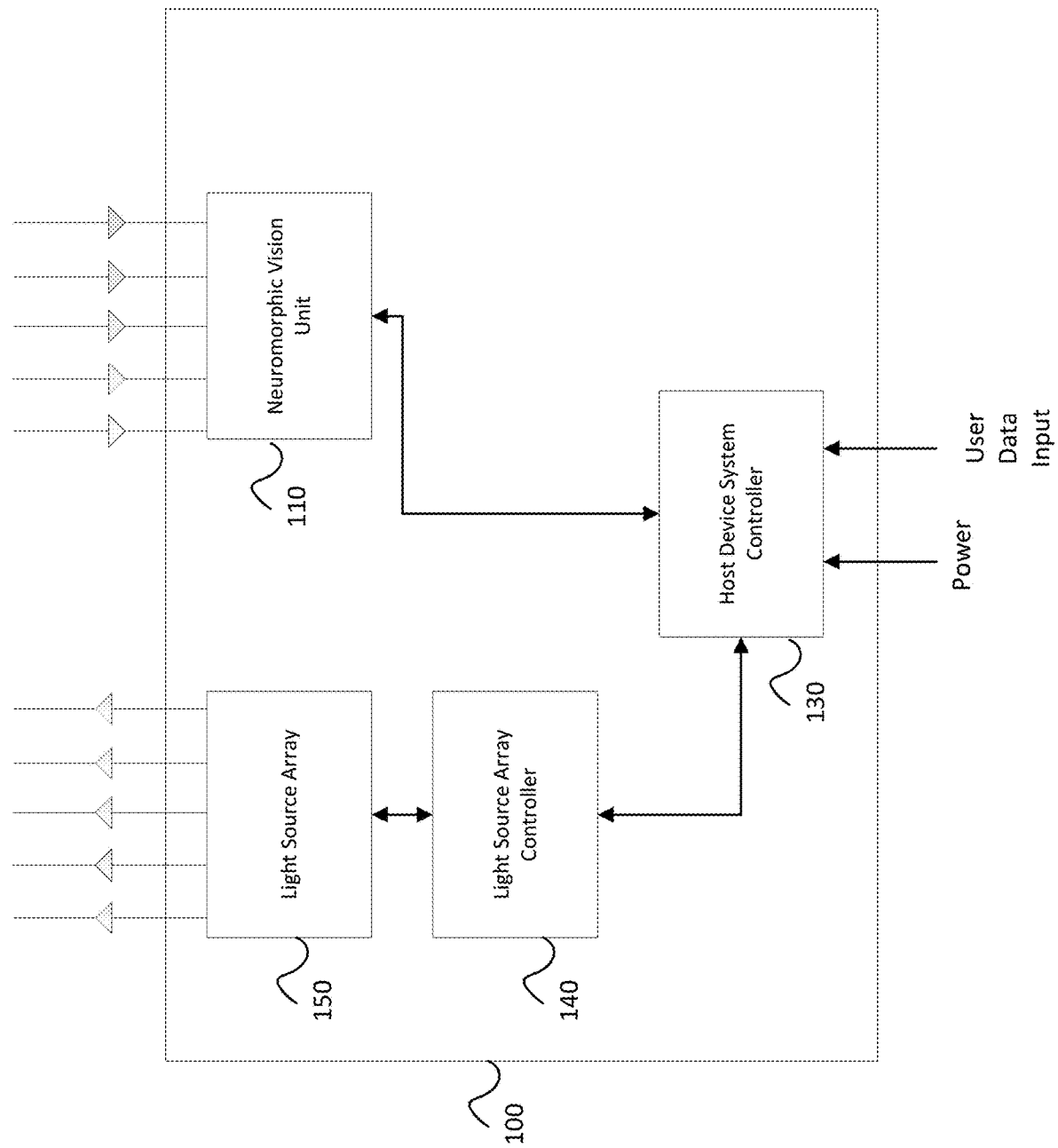
FIG. 1 illustrates a system with a neuromorphic vision unit and adaptive light source array in an implementation of the present disclosure.

Light emitting pixel arrays support applications that benefit from fine-grained intensity, spatial, and temporal control of light distribution. This control can include, but is not limited to, precise spatial patterning of emitted light from pixel blocks or individual pixels. Depending on the application, emitted light can be spectrally distinct, adaptive over time, and/or environmentally responsive. The light emitting pixel arrays can provide pre-programmed light distribution in various intensity, spatial, or temporal patterns. The emitted light can be based at least in part on received sensor data and can be used for optical wireless communications. Associated electronics and optics can be distinct at a pixel, pixel block, or device level.

Light emitting pixel arrays can be formed from one, two, or three dimensional arrays of LEDs, VCSELS, OLEDs, or other controllable light emitting systems. Light emitting pixel arrays can be formed as pixel arrays on a monolithic substrate, formed by partial or complete segmentation of a substrate, formed using photolithographic, additive, or subtractive processing, or formed through assembly using pick-and-place or other suitable mechanical placement. Light emitting pixel arrays can be uniformly laid out in a grid pattern, or alternatively can be positioned to define geometric structures, curves, random, or irregular layouts.

A controller can be connected to selectively power subgroups of light emitting pixels in the light emitting pixel arrays to provide different light beam patterns. At least some of the light emitting pixels in the light emitting pixel arrays can be individually controlled through connected electrical traces. In other implementations, groups or subgroups of light emitting pixel arrays can be controlled together. In some implementations, the plurality of light emitting diodes can have distinct non-white colors. For example, at least four of the plurality of light emitting diodes can be RGBY groupings of light emitting diodes.

Light emitting pixel array luminaires can include light fixtures that can be programmed to project different lighting patterns based on selective pixel activation and intensity control. Such luminaires can deliver multiple controllable beam patterns from a single lighting device using no moving parts. Typically, delivering such beam patterns is performed by adjusting the brightness of individual LEDs in a 1D or 2D array. Optics, whether shared or individual, can optionally direct the light onto specific target areas. In some implementations, the height of the light emitting diodes, their supporting substrate and electrical traces, and associated micro-optics can be less than 5 millimeters.

Light emitting pixel arrays, including LED or µLED pixel arrays, can be used to selectively and adaptively illuminate buildings or areas for improved visual display or to reduce lighting costs. In addition, light emitting pixel arrays can be used to project media facades for decorative motion or video effects. In conjunction with tracking sensors and/or cameras, selective illumination of areas around pedestrians is possible. Spectrally distinct pixels can be used to adjust the color temperature of lighting, as well as support wavelength specific horticultural illumination.

Street lighting is an application that can greatly benefit from use of light emitting pixel arrays. A single type of light emitting pixel array can mimic various street light types, allowing, for example, switching between a Type I linear street light and a Type IV semicircular street light by appropriate activation or deactivation of selected pixels. In addition, street lighting costs can be lowered by adjusting light beam intensity or distribution according to environmental conditions or time of use. For example, light intensity and area of distribution can be reduced when pedestrians are not present. If pixels of the light emitting pixel array are spectrally distinct, the color temperature of the light can be adjusted according to respective daylight, twilight, or night conditions.

Light emitting pixel arrays are also well-suited for supporting applications involving direct or projected displays. For example, warning, emergency, or informational signs can all be displayed or projected using light emitting pixel arrays. This use of arrays allows, for example, color changing or flashing exit signs to be projected. If a light emitting pixel array is composed of a large number of pixels, textual or numerical information can be presented. Directional arrows or similar indicators can also be provided.

Vehicle headlamps are a light emitting pixel array application that include large pixel numbers and a high data refresh rate. Automotive headlights that actively illuminate selected sections of a roadway can be used to reduce problems associated with glare or dazzling of oncoming drivers. Using infrared cameras as sensors, light emitting pixel arrays activate those pixels that illuminate the roadway, while deactivating pixels that might dazzle pedestrians or drivers of oncoming vehicles. In addition, off-road pedestrians, animals, or signs can be selectively illuminated to improve driver environmental awareness. If pixels of the light emitting pixel array are spectrally distinct, the color temperature of the light can be adjusted according to respective daylight, twilight, or night conditions. Some pixels can be used for optical wireless vehicle to vehicle communication.

For purposes of illustrating the present innovation, it might be useful to understand phenomena relevant to various implementations thereof. The following foundational information can be viewed as a basis from which the present disclosure properly can be explained. Such information is offered for purposes of explanation only and, accordingly, should not be construed in any way to limit the broad scope of the present disclosure and its potential applications.

A system with a neuromorphic vision sensor can be equipped with a sensor including photodetector pixels and an analog/digital circuit (e.g., computing unit) attached to each pixel of the sensor. The analog/digital circuit (or computing unit) at each pixel applies computation at the pixel level. In this way, instead of transferring all of the raw sensor data, a limited amount of data (e.g., only the output produced by the analog/digital circuit or by the algorithm running on the computing unit) is transferred. As a result, the amount of transferred data and, hence, power consumption can be reduced.

In addition, focal-plane sensor-processor (FPSP) arrays are a known type of programmable sensor. In addition to a mixed-signal (i.e., analog and/or digital) processing capability, a photodetector at each pixel can have its own spatially varying exposure time. In other words, each pixel can have a different exposure time than the others. Thus, along with a programmable exposure time, the sensitivity (ISO) of a pixel can also be increased or reduced. This type of FPSP sensor can be used to improve high dynamic range (HDR) images and to support fast forward and/or motion freeze.

Further, a method for an adaptive LED can be provided, where a segmented LED is adapted for a scene. That is, based on a position of an object from the scene, the LED segments are configured to have better illumination of the scene. The adaptive LED can address problems of over-exposure and under-exposure that occur with a conventional LED flash.

Thus, if the adaptive LED is used as a flash for a camera, an illumination pattern emitted by the adaptive LED can be adapted to the scene. For instance, the adaptive LED may provide more light to parts of the scene that are not well-lit by ambient light. Similarly, the adaptive LED may provide less light to parts of the scene that are well-lit by ambient light or are very close to the camera.

FIG. 1 illustrates a system 100 with a neuromorphic vision unit 110 and adaptive light source array 150 in an implementation of the present disclosure. The system 100 includes the neuromorphic vision unit 110, a host device system controller 130, a light source array controller 140, and light source array 150.

The neuromorphic vision unit 110 includes neuromorphic pixels that receive light reflected or produced by one or more objects in a scene. The neuromorphic pixels produce data, using the photoelectric effect, based on the light received from the one or more objects in the scene. Thus, the neuromorphic vision unit 110 collects data from the scene.

In the implementation illustrated in FIG. 1, one or more neuromorphic algorithms can be run on the neuromorphic vision unit 110. The neuromorphic vision unit 110 can use the neuromorphic algorithms to perform a determination of attributes of the one or more objects in the scene. The attributes can include positions, first-order attributes like velocities and previous positions, second-order attributes like accelerations and previous velocities, and/or brightnesses of the one or more objects in the scene.

Thus, the neuromorphic vision unit 110 can determine a plurality of regions in the scene, based on the one or more objects. Each of the plurality of regions can include one or more of the objects.

The neuromorphic vision unit 110 performs this determination based at least in part on the data produced. In one implementation, the neuromorphic vision unit 110 performs this determination based on supplemental position data.

For example, in some implementations, the system 100 can include one or more additional sensors (not pictured), such as radar, lidar, or a camera, that can produce the supplemental position data. For example, the supplemental data can be or include, for example, position data produced by the one or more additional sensors.

The neuromorphic vision unit 110 can determine an exposure time of pixels of the neuromorphic vision unit 110. The neuromorphic vision unit 110 can determine the exposure time of the pixels at least partly based on the regions in the scene and the attributes of the one or more objects.

In some implementations, the neuromorphic vision unit 110 additionally or alternatively can decide an exposure setting of pixels of the neuromorphic vision unit 110 or pixels of a later-described camera, at least partly based on the regions in the scene and the attributes of the object. In this disclosure, the term "exposure setting" refers to both an exposure time and sensitivity settings.

In addition, the neuromorphic vision unit 110 can determine current and/or pulse-width settings (e.g., of a single pulse or a duty cycle of a cycle of pulses) of segments or pixels of the light source array 150. In one implementation, the neuromorphic vision unit 110 can determine these current and/or PWM settings, based on a computation performed on the neuromorphic vision unit 110 or on the host device system controller 130. This choice can be made based on, for example, an application type.

Thus, the neuromorphic vision unit 110 can determine light source and pixel configurations, based on the positions and/or velocities determined by the neuromorphic algorithm.

The host device system controller 130 can receive the light source and pixel configurations produced by the neuromorphic vision unit 110.

The host device system controller 130 can transmit the light source and neuromorphic and sensor pixel configurations to the light source array controller 140 for controlling the light source array 150. Thus, the host device system controller 130 can be a relatively simple processor.

In other implementations, the host device system controller 130 itself can convert the light source and pixel configurations into settings for controlling the light source array 150. Alternatively, the host device system controller 130 can obtain raw data from the neuromorphic vision unit 110 and produce the light source and neuromorphic pixel configurations itself. In implementations including a sensor system, like a camera, the host device system controller 130 can produce settings for the camera based on the raw data. Thus, the host device system controller 130 can be a more complex device that can itself execute a portion (or the entirety) of algorithm.

The light source array controller 140 receives the transmitted configuration or produced settings from the host device system controller 130. The light source array controller 140 can determine or otherwise produce signals for adjusting pixels or segments of the light source array 150. In some implementations, these signals are analog currents. In other implementations, these signals are digital signals, such as pulses or pulse-width modulated signals. In other implementations, these signals are hybrid, i.e., are analog currents with modulated pulse-widths.

The light source array 150 receives the signals output by the light source array controller 140. The light source array 150 includes an array of light sources, such as LEDs or vertical-cavity surface-emitting lasers (VCSELs), as pixels. The light sources can produce light in the infrared, visible, and/or ultraviolet spectrum.

In most implementations, the array of light sources is a matrix or one-dimensional vector. Thus, the array is generally arranged in a square or rectangular shape. The scope of the present disclosure includes other implementations, such as disc or diamond shapes.

The light source array 150 can be an adaptive LED display. The light source array 150 includes several segments of one or more light sources in a matrix or vector. Each of the segments can be controlled individually by the light source array controller 140. For example, each of the segments can have its own settings (e.g., current, PWM) to illuminate the scene.

The system 100 can also include optics for directional illumination of the scene by the light source array 150. In some implementations, a display is projected with a projection lens. The system 100 (and, particularly, later-described sensor system 720 of system 700) can take pictures of the display with the light source as a direct view.

As with conventional LED arrays, the light source array controller 140 can drive all of the segments of the light source array 150 with a same signal. For example, the light source array controller 140 can turn off all of the segments simultaneously. The light source array controller 140 can also turn on all of the segments, such that all of the light sources emit light simultaneously.

In addition, the light source array controller 140 can control a single segment. Similarly, the light source array controller 140 can control multiple segments simultaneously and independently.

Generally, all of the light sources of light source array 150 are included in at least one segment, although implementations are possible in which one or more of the light sources are not controlled as part of a segment.

In addition, the light sources of the light source array 150 can be included in multiple segments. For example, in an implementation in which the light source array 150 is a rectangular matrix, a light source can be part of a row segment, as well as of a column segment.

The segments of the light source array 150 can be matrices or vectors. For example, a light source array in a 4×4 matrix can include four 2×2 segments.

Thus, the light source array controller 140 can control the light source array 150 in its entirety, as individual or plural segments simultaneously, and in different shapes (e.g., vectors or sub-matrices). Accordingly, the light source array 150 can be controlled by the light source array controller 140 at a plurality of granularities.

Specifically, the light source array controller 140 can illuminate a first segment of the light source array 150 differently than a second segment of the light source array 150. For example, the first segment can illuminate a first region of the scene dimly, while the second segment can dim illuminate a second region of the scene brightly.

When this illumination difference is instructed by the neuromorphic vision unit 110 and not from a more complicated processing or from a more powerful processor, the differential illumination can be achieved with lower processor power consumption and/or lower latency. In addition, a position sensor of a conventional adaptive LED system can be enhanced by the neuromorphic vision unit 110 detecting velocities, accelerations, and brightness.

Thus, some implementations of the system 100 combine a programmable neuromorphic vision unit 110 and the light source array 150 in a self-adaptive concept. The neuromorphic vision unit 110 can tune the exposure time and sensitivity of a region of pixels of a programmable sensor (e.g., the neuromorphic vision unit 110 or camera) and the configurations of light sources within the light source array 150.

Depending on the application, the neuromorphic vision unit 110 can co-tune the current or PWM values of each segment of the light source array 150 and exposure time of a pixel (at single pixel or region granularity of a sensor) in the spatial domain. To give an example, a part of the scene to be illuminated by a segment of the light source array 150 and a region of a sensor that senses that part can have a local setting (e.g., pixel exposure or sensitivity, LED current/PWM) that is different from segments and regions for other parts of the scene. For example, in a particular implementation, pixel exposure times are adjustable per region/pixel of the neuromorphic vision unit 110. Local tuning of the exposure time and other settings for various (e.g., neuromorphic, light source, camera sensor) pixels corresponding to each region of the scene results in a set of local optimum settings. A dynamic scene in which a first object moves at a different speed than a speed of a second object can benefit from the local sensor and light source setting.

In addition, a first sensor region, sensor region 1, of neuromorphic vision unit 110 can sense a first moving object on a dark background. The light source array controller 140 can be instructed to control a corresponding first region, LED segment 1, of the light source array 150, based on the neuromorphic vision unit 110 sensing the first moving object. As a result, light source array controller 140 can output a minimum pulse width, PWM duty cycle, or LED current to LED segment 1 that lights the first moving object sufficiently.

Thus, as the system provides sufficient LED peak illuminance, the neuromorphic vision unit 110 can reduce an exposure setting (e.g., exposure time or sensitivity) of sensor region 1 locally to a value that minimizes a motion blur of the first moving object. In implementations including a camera, the neuromorphic vision unit 110 likewise can set an exposure time of a corresponding first region of the camera to a value that minimizes a motion blur of the first moving object.

A second region, sensor region 2, of the neuromorphic vision unit 110 can sense a second moving object traveling at a different speed in the foreground of the scene. Thus, the light source array controller 140 can control a PWM duty cycle (or LED current) of LED segment 2 independently of the PWM duty cycle (or LED current) of LED segment 1. Thus, the illumination of the second moving object can be optimized, independent of the illumination of the first moving object.

Further, the neuromorphic vision unit 110 can set an exposure setting of sensor region 2 independently of the exposure setting of sensor region 1. Thus, sensor region 2 of the neuromorphic vision unit 110 can be optimized to reduce or eliminate motion blur for the second moving object. In implementations including a camera, the neuromorphic vision unit 110 likewise can set an exposure setting (e.g., exposure time) of a corresponding second region of the camera to a value that does not lead to a motion blur of the second moving object.

Thus, the neuromorphic vision unit 110 can balance scene illumination to overcome under-exposure and/or over-exposure problems by instructing the light source array controller 140 and can overcome motion blur by controlling the regions of neuromorphic vision unit 110 (and a camera).

Similarly, the neuromorphic vision unit 110 can shorten the integration time of the darkest part of the scene when the light source array 150 illuminates that part of the scene. Thus, the adaptive lighting of the light source array 150 can illuminate low-light (or otherwise dark) areas of the scene, especially for objects that are far from the sensor. In some implementations, this illumination can be provided in combination with another software application running on the neuromorphic vision unit 110. Thus, the application breadth and distance range of the system 100 can be enhanced.

Figure 2:
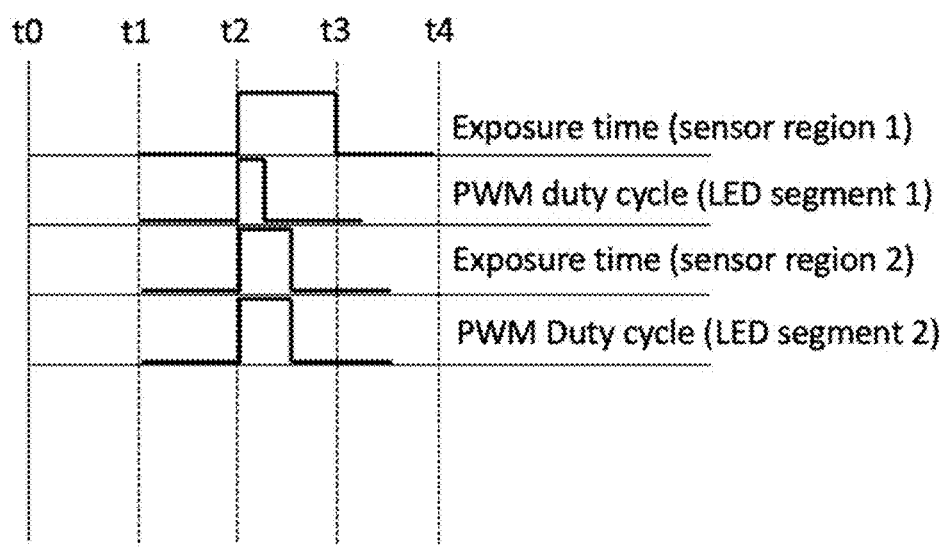
FIG. 2 illustrates exposure time and pulse-width modulation (PWM) duty cycle configurations in an implementation of the present disclosure for two regions in an example of a scene.

FIG. 2 illustrates exposure time and PWM duty cycle configurations in an implementation of the present disclosure for two regions (Region 1, Region 2) in an example of a scene. Region 1 is illuminated with a first light source, such as LED segment 1, of light source array 150 and is sensed by sensor region 1 of neuromorphic vision unit 110. Region 2 is illuminated with a second light source, such as LED segment 2, of light source array 150 and is sensed by sensor region 2 of neuromorphic vision unit 110.

As discussed previously, the neuromorphic vision unit 110 can set the exposure time of sensor region 1 to a value that does not lead to a motion blur of the first moving object. Further, the PWM duty cycle of LED segment 1 is set to a minimum that sufficiently lights the first moving object.

If the second moving object is traveling at a higher velocity than the first moving object, then the exposure time of the sensor region 2 can be reduced, relative to the exposure time of the sensor region 1. In addition, the PWM duty cycle of LED segment 2 is greater than the PWM duty cycle of LED segment 1. Thus, LED segment 2 illuminates the second moving object more brightly than the LED segment 1 illuminates the first moving object.

Figure 3:
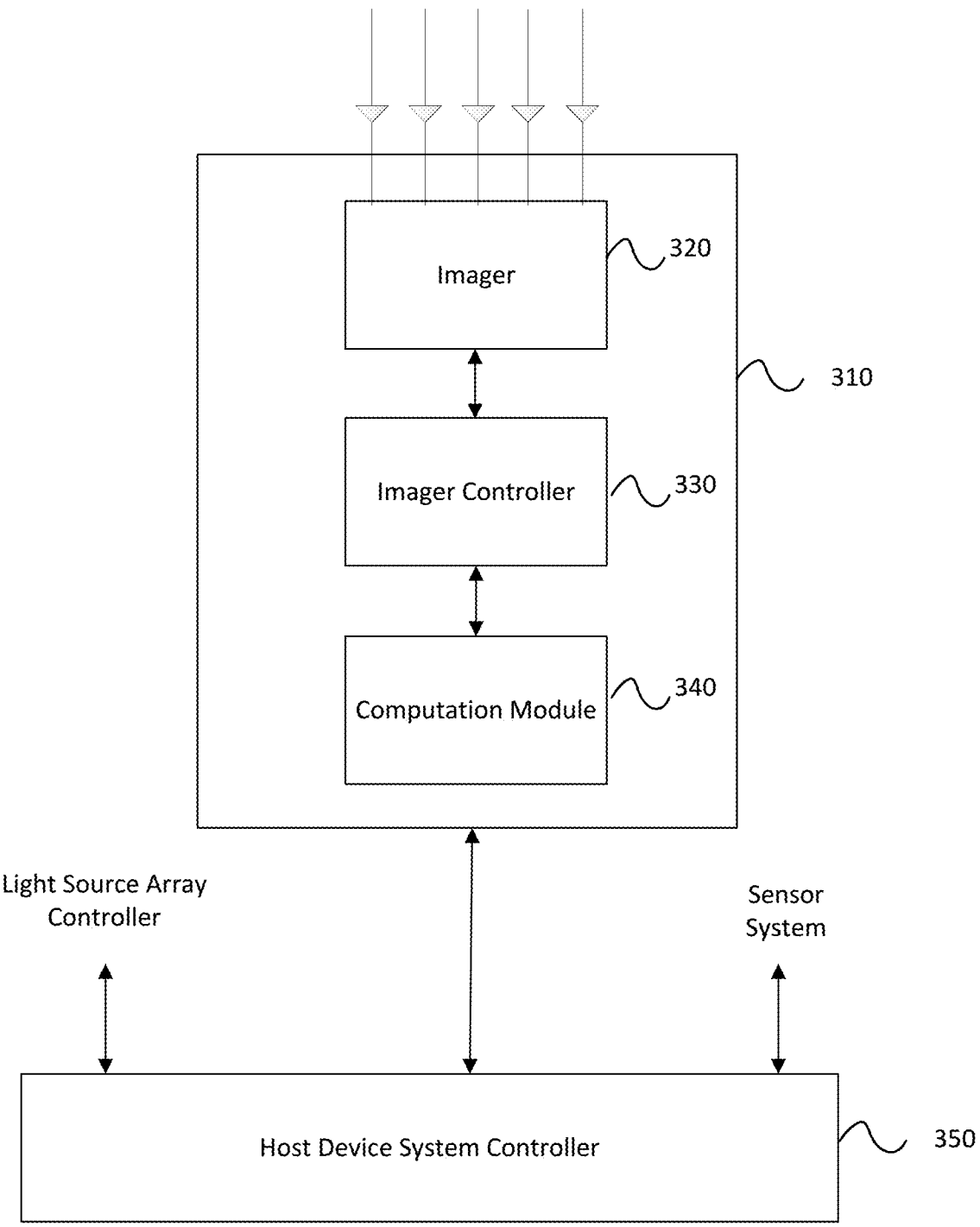
FIG. 3 illustrates a neuromorphic vision unit and a host device system controller in an implementation of the present disclosure.

FIG. 3 illustrates a neuromorphic vision unit 310 and a host device system controller 350 in an implementation of the present disclosure. In many implementations, the neuromorphic vision unit 310 and the host device system controller 350 are similar to the neuromorphic vision unit 110 and the host device system controller 130 of FIG. 1.

The neuromorphic vision unit 310 includes an imager 320, an imager controller 330, and a computation module 340.

The imager 320 includes the neuromorphic pixels, which are arranged in a matrix, including plural rows and columns, or a vector consisting of a single row or a single column. The neuromorphic pixels photoelectrically receive data from the scene. Thus, the imager 320 can be implemented by one or more photodetectors. Imager 320 can include, for example, sensor region 1 and sensor region 2 of FIG. 2.

The imager controller 330 controls the imager 320. For example, the imager controller 330 can control the settings of the pixels of the imager 320. These settings can include, for example, an exposure time or a sensitivity. The imager controller 330 can control the pixels of imager 320 at an individual level, at a region level, or at a global level.

The computation module 340 has mixed signal capabilities and can generate statistics about the one or more objects in the scene. In some implementations, the computation module 340 can be programmed to carry out tasks. In other implementations, the computation module 340 can be a fixed hardware solution to realize a certain task. The computation module 340 thus can perform multiple applications including, but not limited to, motion detection.

The host device system controller 350 communicates bi-directionally with a sensor system. The sensor system can be, for example, sensor system 720 pictured in FIG. 7. The sensor system can include, for example, a camera, a radar, or a lidar sensor. The host device system controller 350 receives data from the sensor system, where the data can be, for example, radar or lidar data of the object, image data of the scene captured by the camera, or settings data of the sensor system.

The host device system controller 350 can perform processing on the received data to produce processed data. The host device system controller 350 can then transmit the processed data to the appropriate device.

For example, the processed data can include a command. In another example, the processed data can include updated settings information. The host device system controller 350 can transmit the command or the updated settings information to the sensor system, the neuromorphic vision unit 310, or the light source array controller 140.

The processed data can include exposure settings for the imager controller 330 (e.g., for sensor region 1, sensor region 2 of imager 320), and the host device system controller 350 can transmit the exposure settings to the neuromorphic vision unit 310.

The processed data can be configuration settings (e.g., PWM or current settings, coordinates of an individual light source within light source array 150, a timing), and the host device system controller 350 can transmit the configuration settings to the light source array controller 140.

The host device system controller 350 communicates bi-directionally with the light source array controller 140. For example, the host device system controller 350 can receive initial or current settings data from the light source array controller 140. The host device system controller 350 can update the settings data based on data from the neuromorphic vision unit 310. The host device system controller 350 can then transmit updated settings data to the light source array controller 140.

Figure 4:
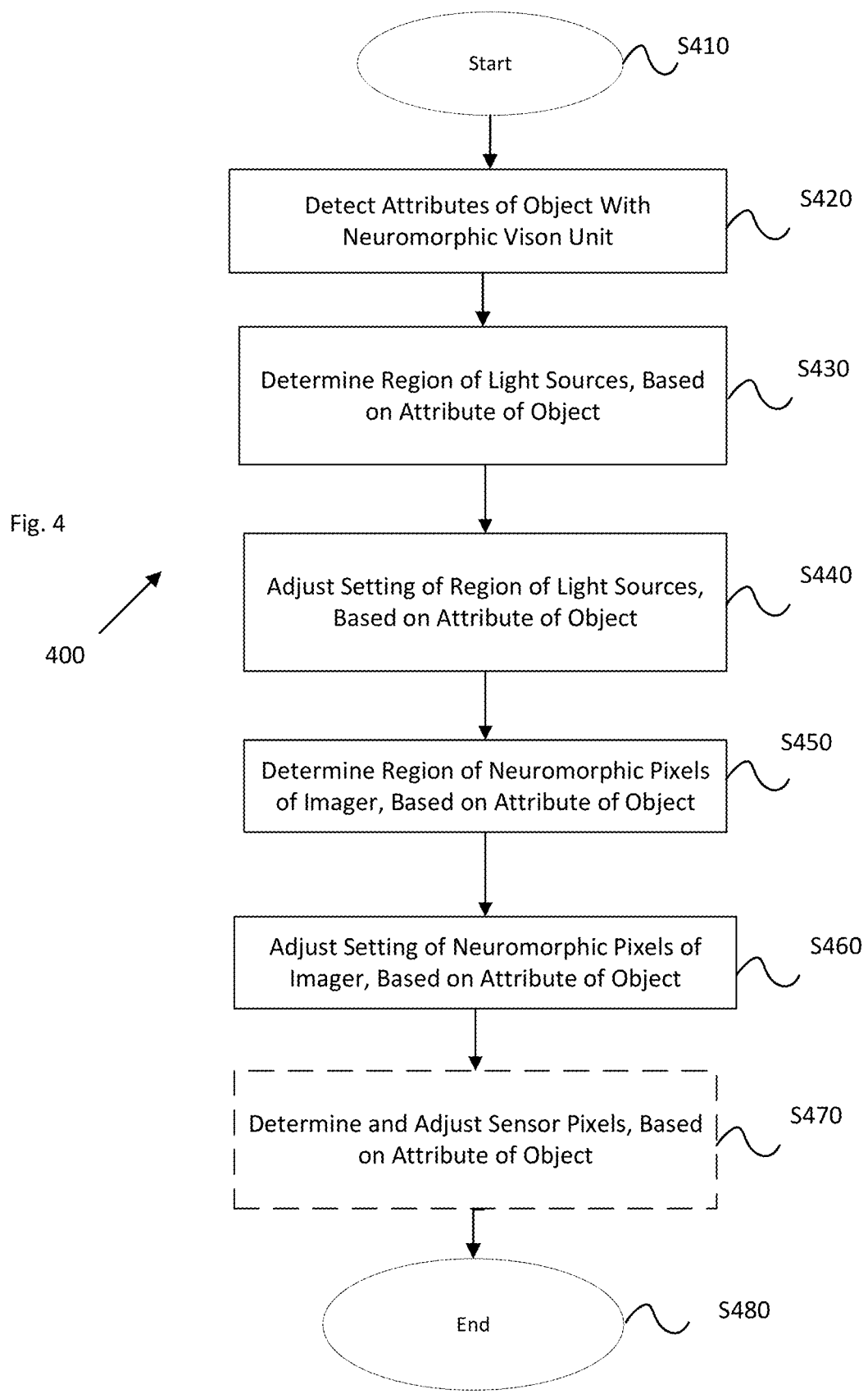
FIG. 4 illustrates an algorithm for an overall flow in an implementation of the present disclosure.

FIG. 4 illustrates an algorithm 400 for an overall flow in an implementation of the present disclosure.

The algorithm begins at S410 and proceeds to S420.

At S420, pixels of the imager 320 photoelectrically capture light received from an object in a scene. In particular, the computation module 340 can determine a region of coordinates of the object in the scene based on light received by the imager 320 from the object. The computation module 340 can determine the region of the object, at least in part based on a region of the pixels within the imager 320 that receive the light. In many implementations, the region of coordinates of the object in the scene includes two-dimensional coordinates (e.g., (X, Y)) with reference to a horizontal and vertical axis. In some implementations, the region of coordinates can also include a third coordinate with reference to a depth axis (e.g., Z in the triplet (X, Y, Z)). The coordinates can take any reference as the origin.

In some implementations, the neuromorphic vision unit 110 can receive position data from a radar or lidar sensor. Thus, the neuromorphic vision unit 110 can determine the region of coordinates of the object in the scene additionally based on the position data. In many such implementations, a third coordinate, corresponding to the depth axis, can be based on this position data.

In addition, the neuromorphic vision unit 110 can produce or receive a timestamp of the time at which the pixels of the imager 320 captured the light from the object.

Based on a change over time in the region of coordinates of the same or similar amount of light and/or based on a change in the amount of light received at the same region of coordinates, the computation module 340 can detect the movement of the object in the scene.

Figure 5A:
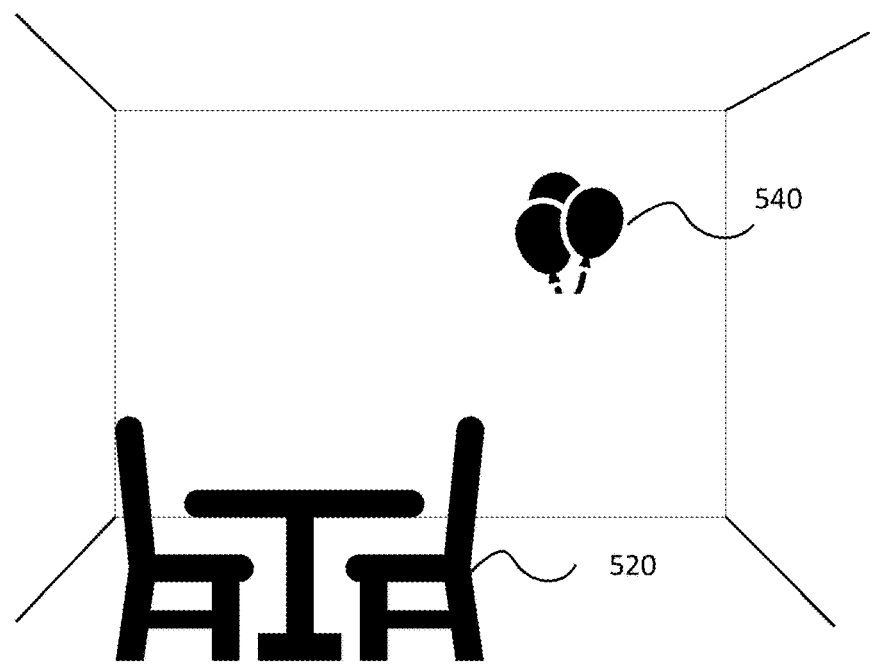
FIG. 5A illustrates an example of a scene to be illuminated by an implementation of the present disclosure.

For example, the scene might be as illustrated as in FIG. 5A. Specifically, FIG. 5A illustrates an example of a scene to be illuminated by an implementation of the present disclosure. FIG. 5A includes a table and chairs 520 and balloons 540. The table and chairs 520 are stationary and in the foreground of the scene, and the balloons 540 are moving and in the background of the scene.

Figure 5B:
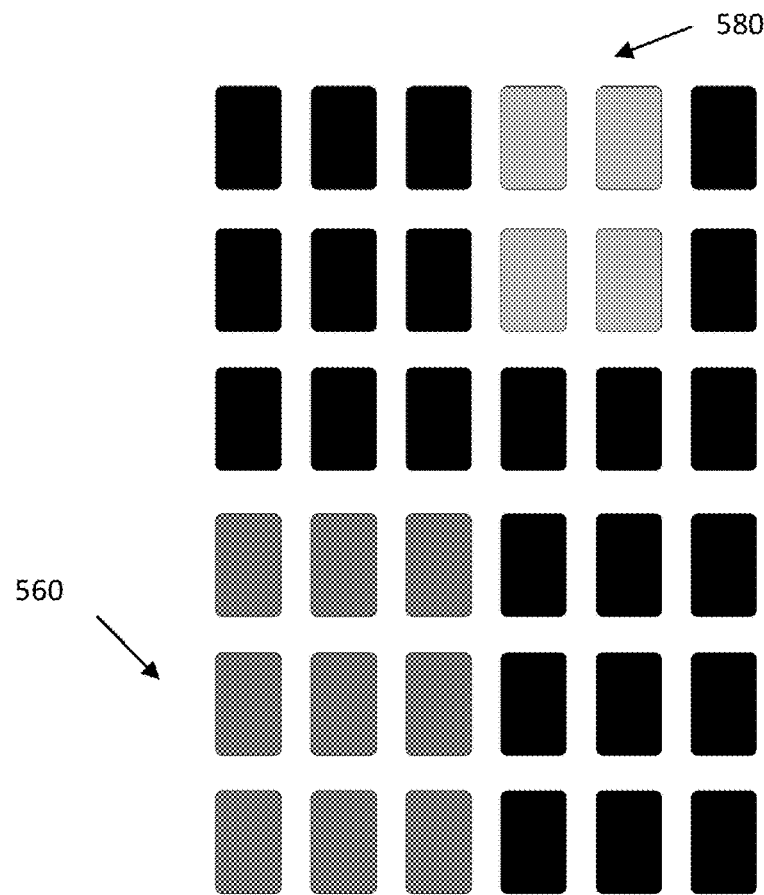
FIG. 5B illustrates an example of a flash intensity profile for an implementation of the present disclosure for the scene illustrated in FIG. 5A.

The table and chairs 520 and the balloons 540 reflect ambient light toward the pixels of imager 320. Thus, in an example of S420 of FIG. 4, the pixels of imager 320 capture this light at time T1. Based on the light captured by imager 320 from table and chairs 520, the computation module 340 determines the table and chairs 520 are in a region bounded by (0,0), (0, 2), (2, 2), and (2, 0), as illustrated in FIG. 5B. Similarly, the computation module 340 can determine balloons 540 are in a first region bounded by (3, 4), (3, 5), (4, 5), and (4, 4), based on the light captured by the pixels of imager 320 from the balloons 540. The computation module 340 can timestamp these regions with time $T_1$.

Later, the pixels of imager 320 capture the reflected ambient light from table and chairs 520 and balloons 540 at time T2. The computation module 340 again determines the table and chairs 520 are in the region bounded by (0,0), (0, 2), (2, 2), and (2, 0). Meanwhile, the balloons 540 have sunk. Thus, the computation module 340 now determines the balloons 540 are in a second region bounded by (3, 3), (3, 4), (4, 4), and (4, 3), based on the light captured by the pixels of imager 320 from the balloons 540. The computation module 340 can timestamp these regions with time $T_2$.

The computation module 340 compares the region for the table and chairs 520 at time T1 and the region for the table and chairs 520 at time T2. Similarly, the brightness of the table and chairs 520 did not change between time T1 and time T2. Thus, the computation module 340 does not determine a change in attributes of the table and chairs 520.

The computation module 340 compares the first region for the balloons 540 at time T1 and the second region for the balloons 540 at time T2. Regardless of a change in brightness of the balloons 540, the neuromorphic vision unit determines a movement of the balloons 540. The neuromorphic vision unit 110 can determine one or more updated attributes of the balloons 540. These attributes can include a position of the balloons 540, a velocity (including direction and the magnitude of velocity) of the balloons 540, an acceleration (including direction and the magnitude of acceleration) of the balloons 540, and, as relevant, a change in brightness of balloons 540.

The computation module 340 can determine the velocity of the balloons 540 by dividing a positional difference between the first region for the balloons 540 and the second region for the balloons 540, by the difference between the timestamp $T_1$ and the timestamp $T_2$. The positional difference preferably, but not necessarily, corresponds to the real-world positional difference, not just a positional difference between pixels of the neuromorphic vision unit 110. Thus, the computation module 340 can supplement this positional difference with additional positional data from a sensor (e.g., a radar or lidar sensor or camera) that detects the balloons 540. The computation module 340 can then calculate the positional difference of the balloons 540 at least in part based on the data received from the sensor.

In some implementations, the additional positional data from the sensor includes a timestamp at which the sensor sensed the data. The computation module 340 can calculate a velocity of the balloons 540 at least in part based on the timestamp from the sensor.

The computation module 340 also can determine the acceleration of the balloons 540 by dividing the difference between the velocity of the balloons 540 at time T1 and the velocity of the balloons 540 at time T2 by the difference between the timestamp T1 and the timestamp T2.

Again, the computation module 340 can supplement the acceleration calculation at least in part based on additional positional data from the sensor. A person having ordinary skill in the art would understand how to perform this further calculation based on the teachings of this disclosure.

In some implementations, the computation module 340 can transmit data indicating the attributes within the system 100, e.g., to host device system controller 130. The algorithm then proceeds to S430.

At S430, the neuromorphic vision unit 110 determines one or more regions of pixels within the light source array 150, at least in part based on the attributes detected at S420.

In particular, the one or more regions are at least in part based on the position of the objects in the scene. For example, if the pixels of light source array 150 are mapped one-to-one to the pixels of the imager 320, then the computation module 340 determines a first region bounded by (0, 0), (0, 2), (2, 2), and (2, 0) and a second region bounded by (3, 4), (3, 5), (4, 5), and (4, 4).

The computation module 340 can determine an additional portion of the region of pixels of the light source array 150, at least in part based on a direction of velocity of the object. For example, the computation module 340 can determine the balloons 540 are sinking. In that situation, the computation module 340 can determine the region of pixels also includes (3, 3) and (4, 3), and (3, 5) and (4, 5). Thus, the computation module 340 can anticipate a continuation of the object's movement.

Further, based on a determination that the balloons 540 are sinking at a speed above a threshold, the computation module 340 can determine the region includes an additional row, e.g., (3, 2) and (4, 2). The threshold can be predetermined or determined dynamically based on attributes (e.g., the acceleration or the size) of the object and the scene.

In addition, the computation module 340 can determine an additional portion of the region of pixels of light source array 150 at least in part based on the acceleration of the object. For example, in a non-pictured example, based on a determination that the balloons have a downward velocity and are accelerating downward, the computation module 340 can determine the region includes an additional row, e.g., (3, 2) and (4, 2), in addition to (3, 3) and (4, 3) for the velocity. Based on a determination that the balloons 540 have an upward velocity and are accelerating downward (e.g., were bumped upward and are being pulled downward by gravity), the computation module 340 can determine the region includes fewer rows (e.g., only (3, 6) and (4, 6) instead of also (3, 7) and (4, 7)).

The use of the identical regions of coordinates of the imager 320 for the regions of coordinates of the light source array 150 in FIG. 5B is for purposes of illustration, not limitation. In many implementations, the light source array 150 and the imager 320 have different sizes and/or resolutions. Therefore, the regions of the light source array 150 and the imager 320 can be different. Thus, the light source array 150 and the imager 320 can use different coordinate systems, and the computation module 340 can achieve compatibility by converting between the different coordinate systems.

In addition, a pixel in imager 320 is generally offset from a corresponding pixel in the light source array 150 relative to the object. Thus, an angular difference exists between the location of the pixel in the light source array 150, relative to the object, and the location of the pixel within the imager 320, relative to the object. Additionally, because the surface of the object can be textured or curved, the light emitted by the pixel of the light source array 150 and reflected by the object need not return to the corresponding pixel in the imager 320. Thus, the computation module 340 can compensate. In some implementations, at least some of the light sources themselves can emit light at an angle.

For example, many implementations of system 100 include optics, such as lenses, for directional illumination of a scene. The reason is that an array of classical broadly (i.e., Lambertian) emitting LEDs would not illuminate only sub-parts or regions of the scene.

If the computation module 340 determines the object is approaching the camera (e.g., a change in the Z coordinate), the computation module 340 can determine the region includes the pixels of the light source array 150 surrounding (e.g., above, below, to the left of, and to the right of) the position of the object.

Similarly, if the computation module 340 determines the object is receding from the camera, the computation module 340 can determine the region includes the pixels of light source array 150 on the periphery of the position of the object (e.g., just inside the current boundary of the light source pixels corresponding to the object). For example, if a user is holding system 100 and takes a step backward from table and chairs 520, then the computation module 340 can determine the region includes (0, 0), (0, 1), (0, 2), (1, 0), (1, 2), (2, 0), (2, 1), and (2, 2).

The algorithm 400 then advances to S440.

At S440, the computation module 340 instructs the light source array controller 140 to adjust a current and/or a modulation of the regions of the light source array 150 determined in S430. The current and/or modulation is based at least in part on the attributes of the objects (e.g., the table and chairs 520 and/or the balloons 540).

Thus, the computation module 340 can improve the luminance provided to the object by the region of the light source array 150 by increasing the current or, for example, by increasing a duty cycle driving the region of light source array 150. The computation module 340 also can decrease the luminance by decreasing the current or, for example, by decreasing the duty cycle driving the region of pixels of light source array 150.

For example, FIG. 5B can also illustrate an example of a light source intensity profile for the scene illustrated in FIG. 5A. As can be seen, the region bounded by (3, 4), (3, 5), (4, 5), and (4, 4) includes lighter pixels to illustrate that the pixels of light source array 150 corresponding to that region produce more illumination. Thus, the light source array 150 can illuminate the balloons 540 more brightly. A higher level of illumination is more appropriate for an object in the background or an object in motion.

The region bounded by (0, 0), (0, 2), (2, 2), and (2, 0) includes darker pixels to illustrate the pixels of light source array 150 produce less illumination. Thus, the light source array 150 can illuminate the table and chairs 520 at a lower level. A lower level of illumination is more appropriate for an object in the foreground or an object in rest.

The pixels outside the two boxes include much darker pixels to illustrate that the background receives little or no additional illumination. This lack of illumination is appropriate for stationary background objects.

Thus, due to the adaptive illumination, the neuromorphic vision unit 110 can better sense the table and chairs 520 and the balloons 540 in the scene. In implementations including a camera, the camera can better capture a picture of the scene.

In addition or alternatively, the computation module 340 can adjust a brightness provided by the region of pixels of light source array 150, at least in part based on first-order attributes, like the velocity of the object. For example, based on a determination that the balloons 540 are moving downward at a velocity below a threshold, the computation module 340 can increase the illumination slightly. Further, based on a determination that the balloons 540 are moving downward at a velocity above the threshold, the computation module 340 can increase the illumination of the region of the light source array 150 by a greater amount.

Similarly, the neuromorphic vision unit 110 also can adjust an illumination provided by the region of pixels of light source array 150, at least in part based on second-order attributes, like the acceleration of the object. For example, based on a determination that the balloons 540 have an upward velocity and are accelerating downward, the computation module 340 can increase the illumination of the pixels in the region of the light source array 150 slightly. Based on a determination that the balloons 540 have a downward velocity and are accelerating downward, the computation module 340 can increase the brightness of the region of pixels in light source array 150 by a greater amount.

The computation module 340 can weight the illumination provided by the pixels of light source array 150 at least in part based on a degree of certainty as to the relevance of the pixels of light source array 150. For example, the computation module 340 can illuminate the region with a gradient. In some implementations, the gradient can be at least in part based on the attributes of the object. For example, if the computation module 340 determines a first portion of the region of the light source array 150 based on the position of the object, then the computation module 340 can more highly illuminate the light sources in the first portion of the region. If the computation module 340 determines a second portion of the region based on the velocity of the object, then the computation module 340 can more dimly illuminate the light sources in the second portion of the region (e.g., (3, 3) and (4, 3)). The computation module 340 can make more sophisticated determinations based on other attributes, such as previous attributes and the acceleration of the object, particularly relative to the velocity of the object.

If the computation module 340 determines the object is approaching the camera, the computation module 340 can darken the pixels surrounding (e.g., above, below, to the left of, and to the right of) the region of the light source array 150. Similarly, if the computation module 340 determines the object is receding from the imager 320, the computation module 340 can brighten the pixels in the region of the light source array 150 (e.g., on the periphery of the position of the object).

The algorithm 400 then proceeds to S450. In S450, the neuromorphic vision unit 110 determines a region of neuromorphic pixels of the imager 320, based on attributes of the object. These attributes can include a position of the object, a first-order attribute (e.g., direction and/or magnitude of a velocity of the object, position history), and a second-order attribute (e.g., direction and/or magnitude of an acceleration of the object, velocity history).

The neuromorphic vision unit 110 determines a region of neuromorphic pixels of the imager 320 at least in part based on the neuromorphic pixels sensing the position of the object. The neuromorphic vision unit 110 can determine an additional region of pixels of the imager 320, based on the first-order attributes and second-order attributes, in a similar respect to how the neuromorphic vision unit 110 determines the additional portions of the region of pixels of the light source array 150 in S430. For example, the additional region can include pixels in the direction of velocity of the object.

Thus, further explanation is omitted to avoid obscuring the present advancement. The algorithm then proceeds to S460.

In S460, the computation module 340 adjusts the region of neuromorphic pixels of the imager 320, based on the attributes of the object. For example, the computation module 340 adjusts an exposure setting of the neuromorphic pixels of the region of imager 320. If the computation module 340 determines the object has a nonzero velocity or a positive acceleration, then the computation module 340 can reduce the exposure time of the pixels of the region of imager 320. If the computation module 340 determines the object has a negative acceleration, then the computation module 340 can increase the exposure time of the pixels of the region of the imager 320. The algorithm then advances to S470.

In S470, the computation module 340 optionally determines and adjusts pixels of a sensor (e.g., later-described sensor system 720). An example of such a sensor is a camera, whether infrared, monochrome, or RGB (red, green, blue). The computation module 340 can determine a region of the sensor pixels, based on the attributes of the object. For example, the computation module 340 can determine that a pixel of the sensor photoelectrically captures light from the same object as the imager 320 captures light.

The computation module 340 can then determine an additional region of pixels of the sensor, based on the first-order attributes and second-order attributes, in a similar respect to how the computation module 340 determines the additional portion of the region of pixels of the light source array 150 in S430.

The algorithm concludes in S480.

Figure 6:
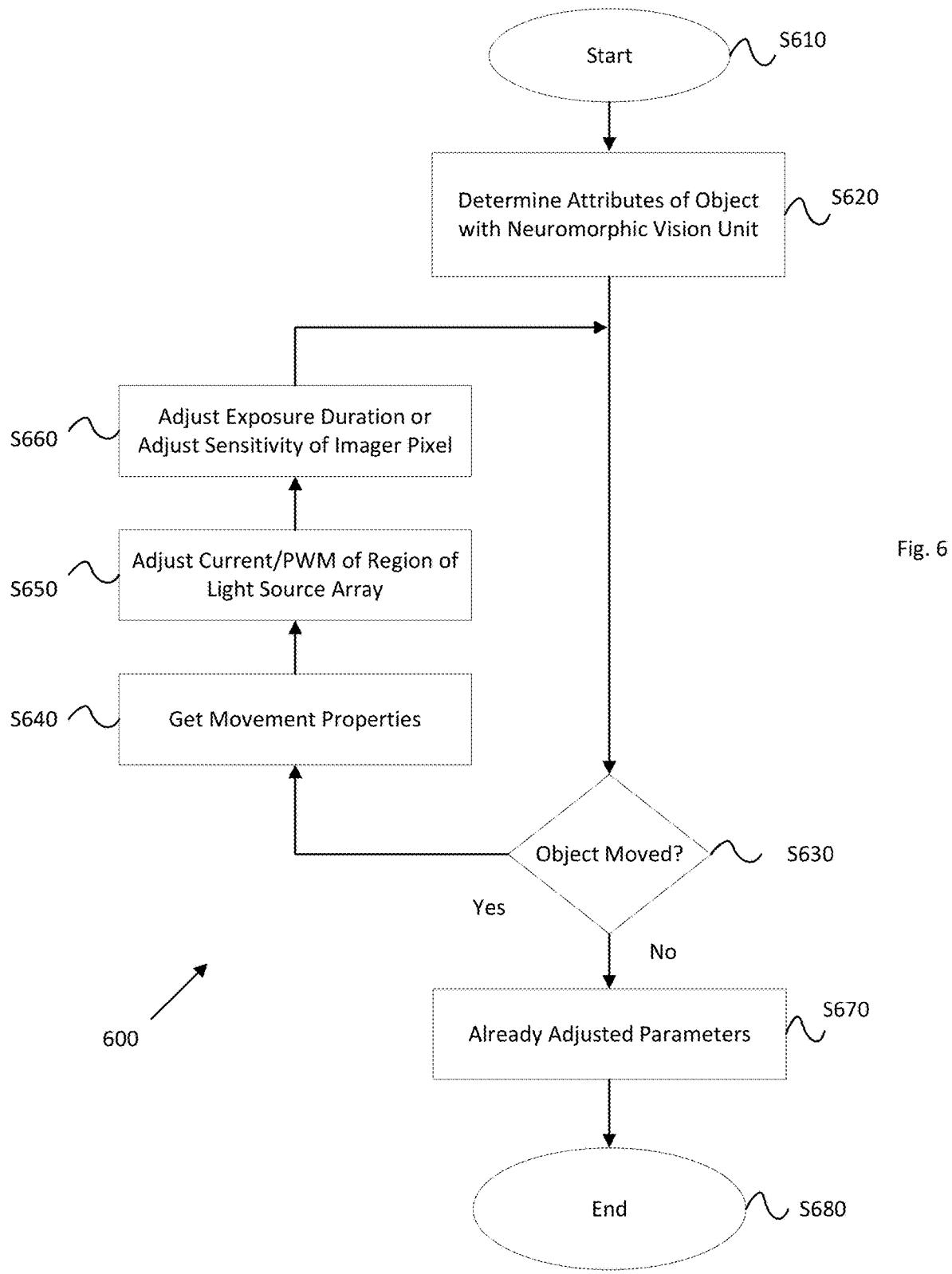
FIG. 6 illustrates an algorithm for tuning an imager and a light source array in an implementation of the present disclosure.

FIG. 6 illustrates an algorithm 600 for tuning an imager 320 and a light source array 150 in an implementation of the present disclosure.

The algorithm 600 begins at S610 and advances to S620. In S620, the computation module 340 determines attributes (e.g., brightness, position, first-order, and second-order attributes) of an object in a manner similar to S420. Thus, a repeat explanation is omitted here. The algorithm then advances to S630.

In S630, the computation module 340 determines whether the object has moved. For example, the computation module 340 can determine whether different pixels in the imager 320 sense the position of the object. In some implementations, this determination can be at least in part based on additional positional data received from a sensor, like radar, lidar, or a camera.

If in S630 the computation module 340 determines the object did move, then the algorithm advances to S640.

In S640, the computation module 340 gets the movement properties of the object. These movement properties can include the pace of the object, as well as its direction of movement. The computation module 340 can also perform another algorithm, if appropriate. The algorithm 600 then advances to S650.

In S650, the computation module 340 determines at least one pixel of a region of the light source array 150, at least in part based on a position of the object. This determination is similar to that described in S430. For example, the computation module 340 can determine the light source pixel, at least in part based on the first order attributes (such as pace and/or direction of movement) and/or the second order attributes, similar to the previous discussion regarding S430.

The computation module 340 then instructs the light source array controller 140 to adjust (e.g., increase or decrease) the current or the duty cycle of the pixel of the light source array 150, at least in part based on attributes of the object, such as described previously regarding S440. This instruction by the computation module 340 adjusts the brightness of the light source array 150. The algorithm then advances to S660.

In S660, the computation module 340 determines at least one neuromorphic pixel of a region of the imager 320, at least in part based on a position of the object. For example, the computation module 340 can determine that the at least one neuromorphic pixel sensed the object. The computation module 340 can also determine the at least one neuromorphic pixel based on the first order attributes (again, such as pace and/or direction of movement) and/or the second order attributes of the object, similar to the previous discussion regarding S450.

The computation module 340 then adjusts (e.g., increases or decreases) the exposure duration or (e.g., increases or decreases) the sensitivity of the region of the imager 320. These adjustments can be, for example, 10% of the value of the exposure duration or the sensitivity of the region. The algorithm 600 then returns to S630.

If the computation module 340 determines in S630 that the object has not moved, then the algorithm 600 advances to S670. In S670, the light source array 150 illuminates the scene using the already adjusted parameters, such as the current and/or PWM duty cycle. Similarly, the neuromorphic vision unit 110 continues to sense the scene with its already adjusted parameters, such as the exposure duration and sensitivity.

The algorithm 600 then advances to S680 and ends.

In at least one implementation, the algorithm 600 can be executed as a continuously running loop. That is, the neuromorphic vision unit 110 can adapt the imager 320 and/or light source array 150 to a scene continuously. In this particular example, the neuromorphic vision unit 110 adjusts the system 100 to moving objects.

An application executing algorithm 600 can have different purposes, as well. For instance, if a user wants to take a snapshot of the scene (e.g., using later-described sensor system 720), then the self-adjustment of the neuromorphic vision unit 110 and/or the light source array 150 can produce snapshots or pictures that are free of motion artifacts.

Figure 7:
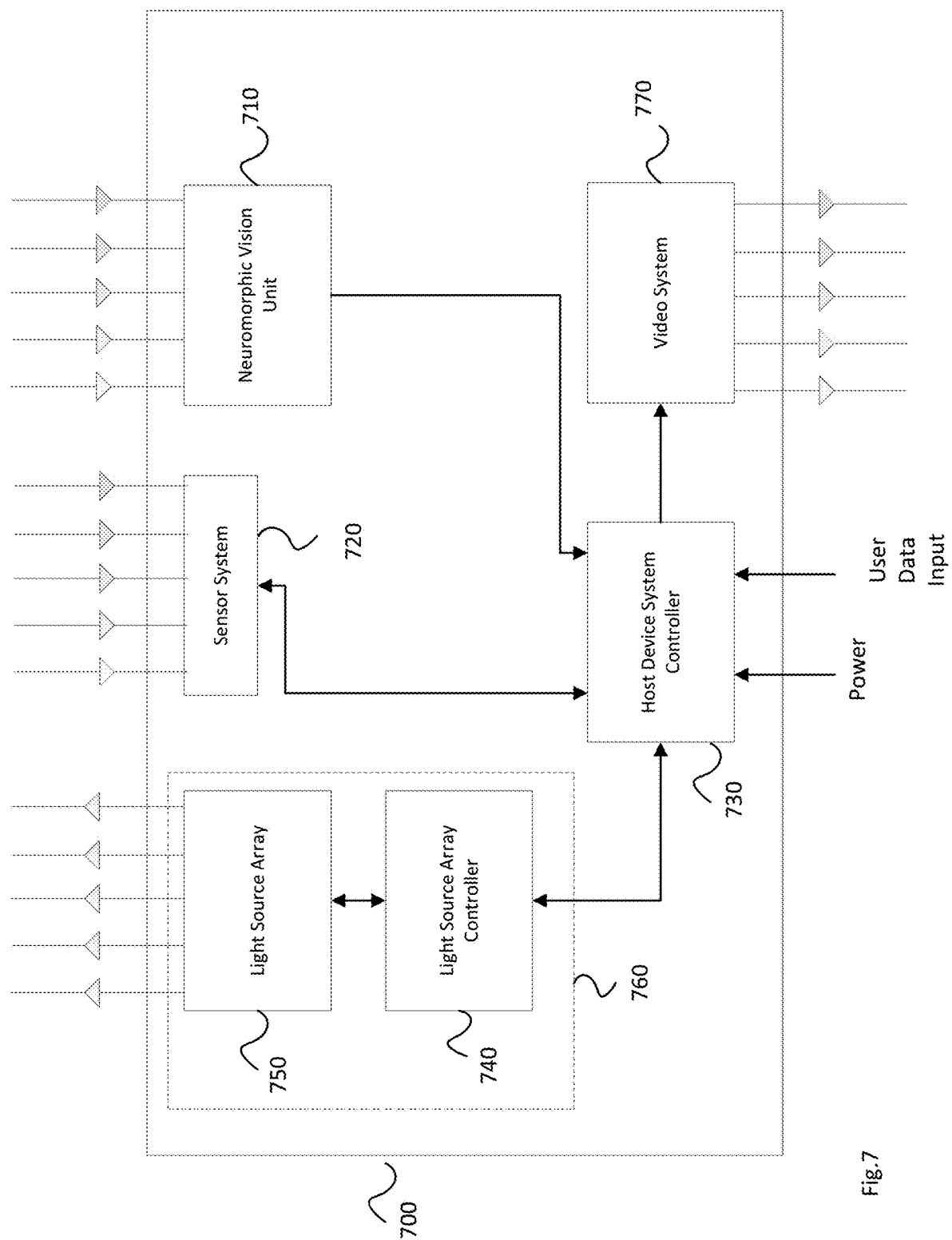
FIG. 7 illustrates a system including a sensor system in an implementation of the present disclosure.

FIG. 7 illustrates a system 700 including a sensor system 720 in an implementation of the present disclosure. The system 700 includes a neuromorphic vision unit 710, a sensor system 720, a host device system controller 730, a flash module 760, and a video system 770.

The neuromorphic vision unit 710 is structurally similar to the neuromorphic vision unit 110 of FIG. 1. For example, neuromorphic vision unit 710 can include the imager 320, the imager controller 330, and the computation module 340. of FIG. 3. The host device system controller 730 is structurally similar to the host device system controller 130 of FIG. 1. Thus, further explanation of the neuromorphic vision unit 710 and the host device system controller 730 is omitted.

The sensor system 720 includes, for example, a camera. The camera can be a standard RGB camera, a monochrome camera, or an infrared camera. Pixels of the sensor system 720 photoelectrically capture visible or infrared light from the one or more objects in the scene. The sensor system 720 transmits the captured photoelectric data to the host device system controller 730.

The flash module 760 includes a light source array 750 and a light source array controller 740. The light source array 750 is structurally similar to the light source array 150. The light source array controller 740 is structurally similar to the light source array controller 140. Further explanation of the light source array controller 140 and the light source array 150 is omitted.

The sensor system 720 suggests considering the combination of the light source array controller 740 and light source array 750 as a flash module 760. In this respect, the flash module 760 can be considered more functional than structural. The flash module 760 can have additional functionality relevant to sensor system 720. For example, the flash module 760 can emit a camera flash, which is a single pulse of light. The flash module 760 also can emit a pre-flash to eliminate "red eye" among human or other animal objects. The neuromorphic vision unit 710 can control the flash module 760 to emit the pre-flash or camera flash, based on the attributes of the object.

The video system 770 includes a plurality of pixels that emit light to output an image or video obtained by the sensor system 720. The pixels of the video system 770 can be LEDs or VCSELs, like the light source array 750. They can also be different kinds of pixels. The video system 770 can receive captured photoelectric data from the host device system controller 730 to output the image or video to, for example, a user.

The flash module 760 can benefit from the high temporal resolution of the neuromorphic vision unit 710. The neuromorphic vision unit 710 performs processing and can transfer only the processed data to outside of the neuromorphic vision unit 710. Transferring a limited amount of data can result in lower latency and, hence, high temporal resolution.

Some implementations of the present disclosure can improve the picture quality of the sensor system 720. For example, an implementation can optimize the lighting of the objects with the adaptive light source array 750 of flash module 760.

In addition, the neuromorphic vision unit 710 can provide to the host device system controller 730 statistics about the one or more objects and the scene. These statistics are generated with fast and efficient computation on the neuromorphic vision unit 710. The host device system controller 730 can transmit these statistics to the sensor system 720.

Figure 8:
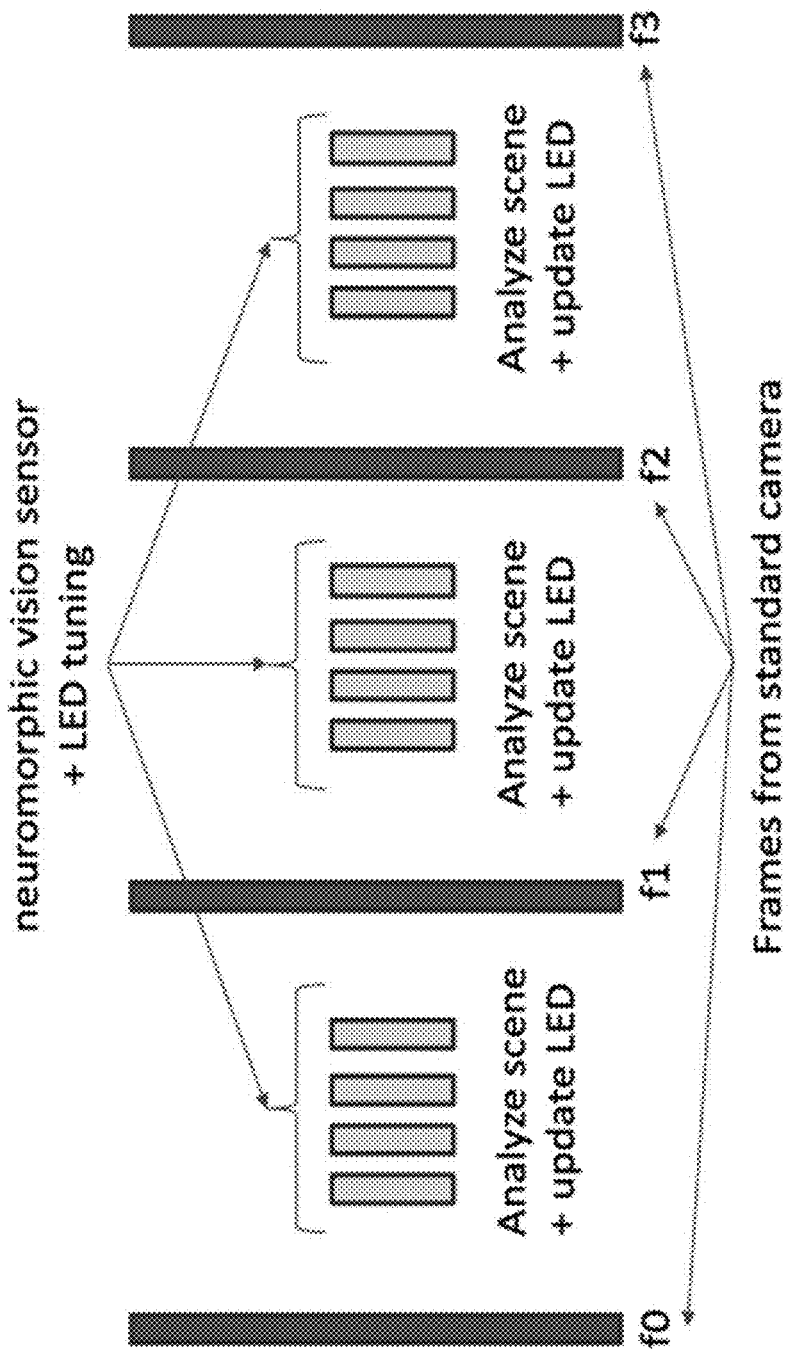
FIG. 8 illustrates a scene analysis in which configurations of both a light source array and a neuromorphic vision unit are carried out faster than a configuration of a sensor system.

FIG. 8 illustrates a scene analysis in which configurations of both the light source array 750 and neuromorphic vision unit 710 can be carried out faster (e.g., at a higher temporal resolution) than configuration of a sensor system 720. As depicted in FIG. 8, co-tuning of an exposure time (e.g., of a pixel of neuromorphic vision unit 710) and an LED (e.g., of light source array 750) can take place in between of frames of a standard camera (e.g., of sensor system 720). The neuromorphic vision unit 710 can perform the co-tuning, at least in part based on the attributes of the object.

Thus, the neuromorphic vision unit 710 can tune the light source array 750, instead of tuning around frames of the sensor system 720. The tuning by the neuromorphic vision unit 710 can result in a lower power consumption than by other processors.

The tuning can improve the video- or picture-taking experience with the sensor system 720 in different ways. For instance, the system 700 can use the tuned light source array 750 for taking flash pictures with the sensor system 720. Using the tuned light sources can result in a well-illuminated image.

In addition, since the neuromorphic vision unit 710 tunes the light source array 750 at a high temporal resolution, the video system 770 can freeze a display of motion in the scene while taking a picture with the sensor system 720.

Further, the neuromorphic vision unit 710 can determine one global optimum exposure setting for the sensor system 720 based on local exposure times. Thus, the system 700 can overcome an over-/under-exposure problem in the scene.

Additionally, the neuromorphic vision unit 710 can provide a local exposure set to establish HDR imaging. For instance, the neuromorphic vision unit 710 can determine, based on local exposure settings of pixels of sensor system 720, minimum and/or maximum values of exposure times of the sensor system 720 for images.

Further, the neuromorphic vision unit 710 can determine a number of images for the final HDR image depending on conditions in the scene. The host device system controller 730 can combine that number of images to create a final HDR image. Thus, the HDR imaging can be improved.

Briefly returning to FIG. 8, that figure illustrates the timing of particular operations with time being the horizontal axis. FIG. 8 illustrates the timing of frames f0, f1, f2, and f3 from a standard camera (e.g., included in sensor system 720). Between each of those frames, the neuromorphic vision unit 710 can analyze the scene and its objects and update a light source (e.g., an LED included in light source array 750). Thus, tuning of the neuromorphic vision unit 710 and the regions of light source array 750 can be achieved between frames of sensor system 720.

In many implementations, neuromorphic vision unit 710 can perform the tuning between frames of sensor system 720 without further modification. Some implementations can delay the capture of a frame by the sensor system 720 to accommodate the tuning by neuromorphic vision unit 710.

Figure 9:
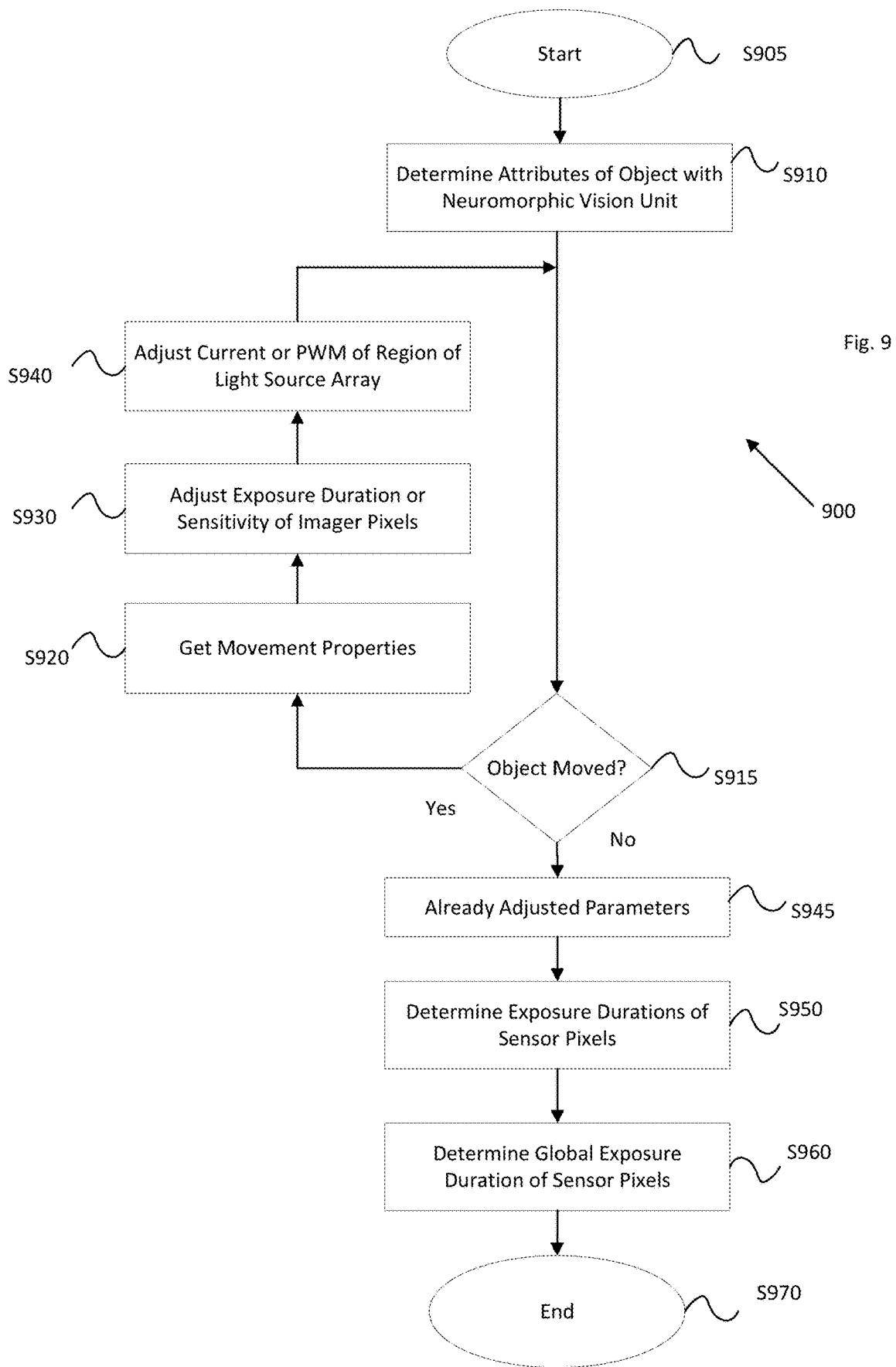
FIG. 9 illustrates an algorithm for tuning exposure durations in an implementation of the present disclosure.

FIG. 9 illustrates an algorithm 900 for tuning exposure settings in an implementation of the present disclosure. Algorithm 900 begins at S905 and advances to S910.

At S910, the neuromorphic vision unit 710 determines attributes of an object in the scene. This determination is similar to the determination in S620. Thus, further discussion of S910 is omitted. The algorithm 900 then advances to S915.

In S915, the neuromorphic vision unit 710 determines whether the object has moved. This determination is similar to the determination in S630. Thus, further discussion of S915 is omitted.

If the neuromorphic vision unit 710 determines in S915 the object has moved, then the algorithm 900 advances to S920.

In S920, the neuromorphic vision unit 710 gets movement properties. These movement properties can include the pace of the object, as well as its direction of movement. The neuromorphic vision unit 710 can also perform another algorithm, if appropriate. The algorithm 900 then advances to S930.

In S930, the neuromorphic vision unit 710 can determine a region of pixels of an imager of the neuromorphic vision unit 710, at least in part based on attributes of the object. The neuromorphic vision unit 710 can then adjust an exposure duration or sensitivity of the pixels in the region of the imager of the neuromorphic vision unit 710, at least in part based on the attributes of the object. These attributes can be or include a position of the object, the pace of the object, and the direction of movement, among other previously discussed attributes. Thus, S930 is similar to S450 and S460, and further explanation of S930 is omitted. The algorithm 900 then advances to S940.

In S940, the neuromorphic vision unit 710 determines a region of pixels in light source array 750, based on the attributes of the object. Again, these attributes can be or include a position of the object, the pace of the object, and the direction of movement, among other previously discussed attributes. The neuromorphic vision unit 710 then adjusts a current or duty cycle of PWM of the region of pixels of the light source array 750, based on the attributes of the object. Here, too, these attributes can be or include a position of the object, the pace of the object, and the direction of movement, among other previously discussed attributes. Thus, S940 is similar to the combination of S430 and S440, and further explanation of S940 is omitted. The algorithm 900 then returns to S915.

If the neuromorphic vision unit 710 determines in S915 the object had not moved, then the algorithm 900 advances to S945.

In S945, the light source array 750 illuminates the scene using the already adjusted parameters, such as the current, pulse-width of a single pulse, and/or duty cycle of a cycle of pulses. Similarly, the neuromorphic vision unit 710 monitors the object in the scene using the already adjusted parameters, such as the exposure duration and sensitivity. The algorithm 900 then advances to S950.

In S950, the neuromorphic vision unit 710 determines an exposure duration of a region of pixels of the sensor system 720, at least in part based on the attributes of the object. These attributes can be or include the pace of the object and/or the direction of movement of the object. This determination can also at least in part be based on the exposure duration of neuromorphic pixels of neuromorphic vision unit 710.

In some implementations, the region of sensor system 720 is limited to those pixels that capture light from the object. In other implementations, the region is based on the first-order and second order attributes of the object. In other implementations, the region includes all pixels of the sensor system 720.

The neuromorphic vision unit 710 then can adjust locally the exposure time of the pixels in the region of the sensor system 720, if possible. For example, the neuromorphic vision unit 710 can decrease the exposure time of the pixels, because the object is in motion. If the neuromorphic vision unit determines that the object has a negative acceleration, then the neuromorphic vision unit 710 can increase the exposure time of the pixels in the region. The algorithm then advances to S960.

In S960, the neuromorphic vision unit 710 determines a global exposure duration of pixels of the sensor system 720 based on local exposure times of the pixels of the sensor system 720. For example, the neuromorphic vision unit 710 can determine the lowest maximum exposure time among all pixels of the sensor system 720 and the highest minimum exposure time among all pixels of the sensor system 720. The neuromorphic vision unit 710 can then select a global exposure time between the lowest maximum exposure time and the highest minimum exposure time. For example, the global exposure time can be an average between the lowest maximum exposure time and the highest minimum exposure time. In other implementations, the neuromorphic vision unit 710 determines a different value for the global exposure time, such as the lowest maximum exposure time or the highest minimum exposure time. The neuromorphic vision unit 710 can then set the exposure duration of each of the pixels of the sensor system 720 to the global exposure duration.

The algorithm 900 then advances to S970 and concludes.

Needless to say, the sensor pixels can capture an image or video using the global exposure time.

Figure 10:
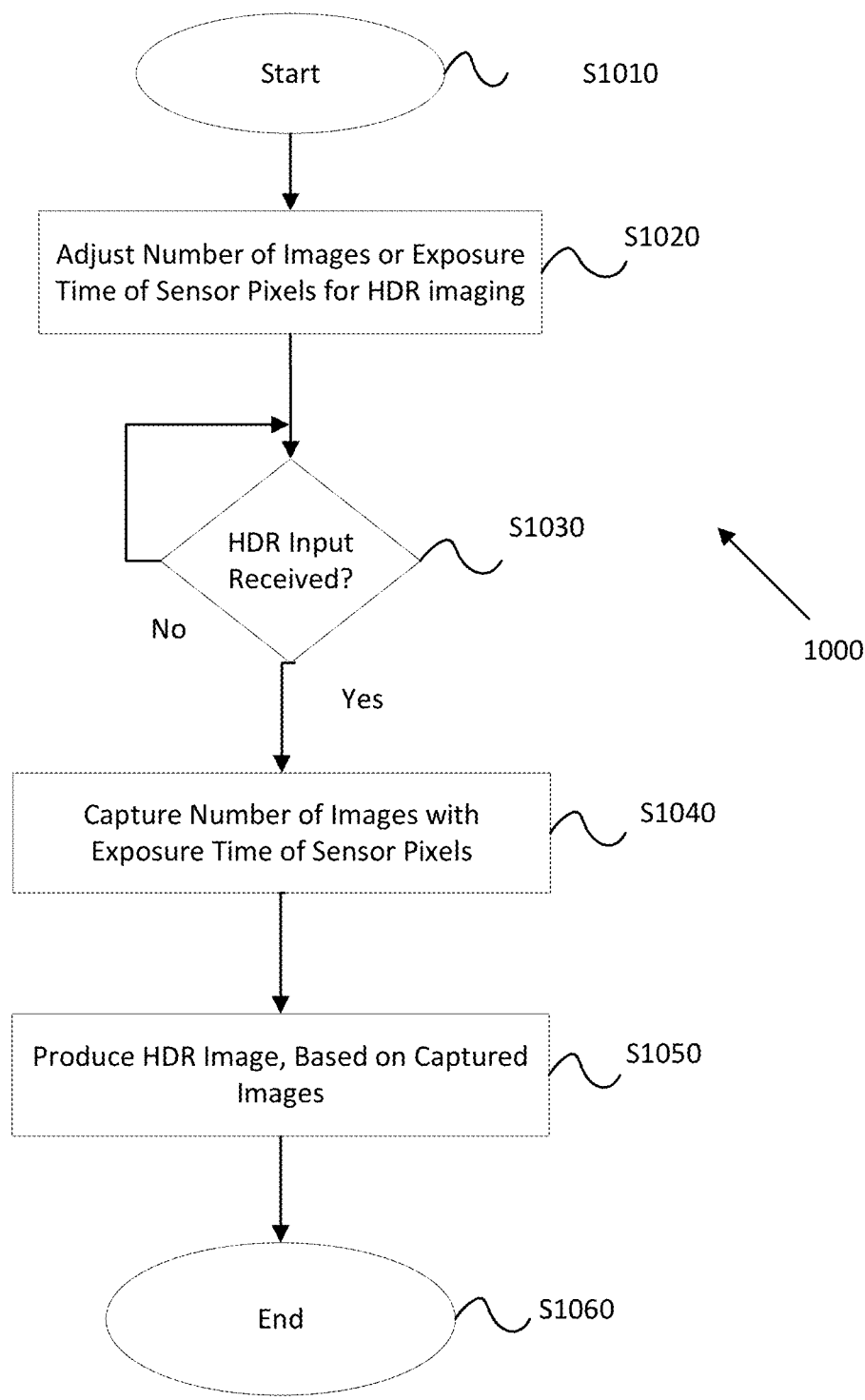
FIG. 10 illustrates an algorithm for producing a high-dynamic-range image in an implementation of the present disclosure.

FIG. 10 illustrates an algorithm 1000 for producing an HDR image in an implementation of the present disclosure. The algorithm 1000 begins at S1010 and advances to S1020.

At S1020, the neuromorphic vision unit 710 adjusts a number of images or an exposure time of the pixels of the sensor system 720 for the HDR image. This adjustment is at least in part based on an attribute of the object. For example, if the neuromorphic vision unit 710 determines that an object is moving, then the neuromorphic vision unit 710 can decrease the number of images or decrease the exposure time of the pixels of the sensor system 720. If the neuromorphic vision unit 710 determines an object has a negative acceleration, then the neuromorphic vision unit 710 can increase the number of images or the exposure time of the pixels of the sensor system 720. The algorithm 1000 then advances to S1030.

At S1030, the host device system controller 730 determines whether it has received an input to initiate production of an HDR image. In many implementations, this input is received from a user using, for example, a soft key on video system 770. The input can be received from a user in any fashion, and, in some implementations, can be generated by the device.

If the host device system controller 730 determines it has not received an input to initiate production of an HDR image, then the algorithm 1000 returns to S1030 and awaits such an input. If the host device system controller 730 determines it has received an input to initiate the production of the HDR image, then the algorithm 1000 advances to S1040.

At S1040, the sensor system 720 captures the number of images determined by the neuromorphic vision unit 710 in S1020. In various implementations, the system 700 flashes differently within the number of images. The sensor system 720 captures these images with the exposure time determined by the neuromorphic vision unit 710 in S1020. The algorithm 1000 then advances to S1050.

In S1050, the host device system controller 730 produces the HDR image based on the images captured by the sensor system at S1040. The algorithm 1000 then advances to S1060 and concludes.

In some implementations, the light source array 150, the light source array 750, and the video system 770 can include a driver system that performs hybrid driving of the light sources.

Figure 11:
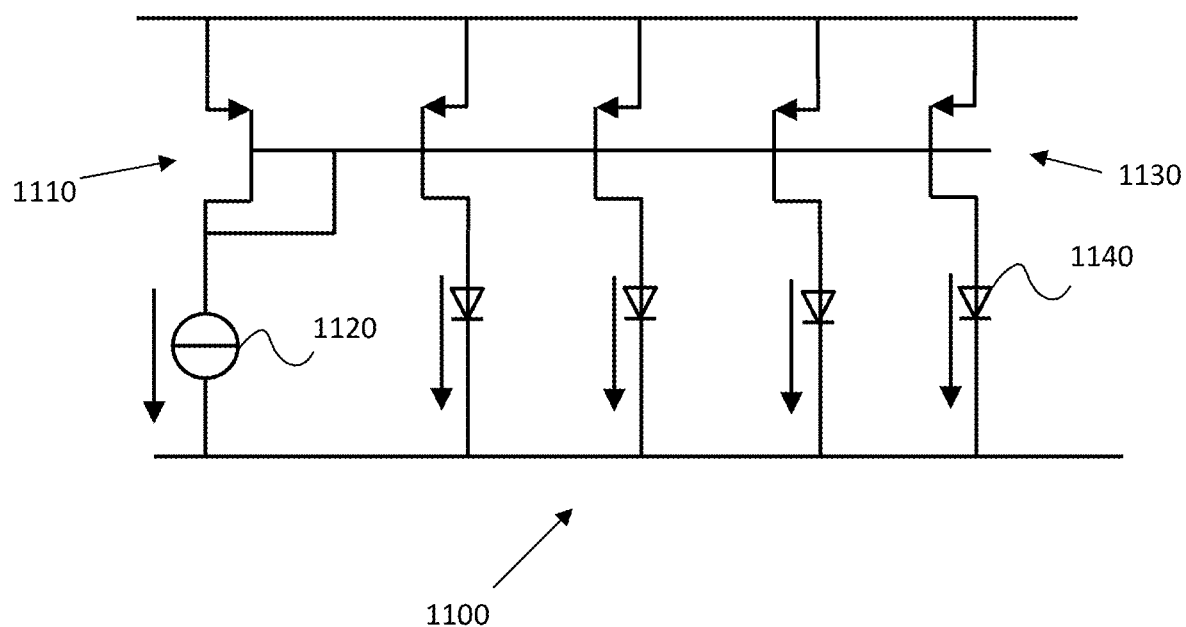
FIG. 11 illustrates a driver system in an implementation of the present disclosure.

FIG. 11 illustrates a driver system 1100 in an implementation of the present disclosure. The driver system 1100 includes a mirror transistor 1110, a current source 1120, driving transistors 1130, and LEDs 1140. The driving unit 1100 also includes a backplane (not pictured).

As illustrated in FIG. 11, mirror transistor 1110 is a PMOS transistor including a first terminal connected to the power signal, such as Vdd. A gate of mirror transistor 1110 is connected to a second terminal of the mirror transistor 1110. In the implementation of FIG. 11, the first terminal of mirror transistor 1110 is a source, and the second terminal of mirror transistor 1110 is a drain. Thus, mirror transistor 1110 is a diode-connected transistor. The mirror transistor 1110 can be a thin-film transistor implemented in the transistor backplane.

Mirror transistor 1110 is not limited to such an implementation. For example, mirror transistor 1110 can be implemented as an NMOS transistor. Additional modifications are known to those of ordinary skill in the art.

Current source 1120 sets a reference current to flow through mirror transistor 1110. In many implementations, current source 1120 is a variable current source. Current source 1120 can be a fixed current source in some implementations. In the implementation of FIG. 11, current source 1120 is a discrete component, such as a resistor, diode, or other transistor. Mirror transistor 1110 and current source 1120 are an implementation of a current source.

A gate of a driving transistor 1130 is connected to a gate of mirror transistor 1110. A first terminal of the driving transistor 1130 is connected to the power signal, Vdd. A second terminal of the driving transistor 1130 is connected to an input of an LED 1140. In the implementation illustrated in FIG. 11, driving transistor 1130 is a PMOS transistor. Thus, the first terminal of driving transistor 1130 is a source, and the second terminal of driving transistor 1130 is a drain.

Thus, driving transistor 1130 forms a current mirror with mirror transistor 1110. As such, the reference current set by the current source 1120 also flows through driving transistor 1130.

The driving transistor 1130 can be, for example, a thin-film transistor implemented on the backplane.

The driving unit 1100 can include multiple driving transistors 1130 arranged similarly to the aforementioned driving transistor 1130. Thus, the driving transistors 1130 generally are the same type, e.g., PMOS. The same first terminals (e.g., sources) of the driving transistors 1130 are connected to the power signal. Similarly, the same second terminals (e.g., drains) of the driving transistors 1130 are connected to the LEDs 1140. The gates of the driving transistors 1130 are connected to each other.

An LED 1140 includes a first terminal connected to the second terminal of the driving transistor 1130. Thus, the LED 1140 receives the reference current driven by the driving transistor 1130. Upon receiving an electric signal, the LED 1140 emits light. A second terminal of the LED 1140 can be connected to a low rail, such as the ground ring.

Thus, the LED 1140 can be implemented in an LED array or be a subpixel.

The light sources in the light source array 150 and light source array 750 can be microLEDs (μLEDs). Video system 770 can also include microLEDs. Thus, light source array 150, light source array 750, and video system 770 can be microLED pixel arrays with dozens, hundreds, thousands, or millions of LEDs positioned together on centimeter-scale-area substrates or smaller. In some implementations, the microLEDs are sized between 30 microns and 500 microns. In various implementations, the light emitting pixels are positioned less than 1 millimeter apart and are typically spaced apart by distances ranging from 30 microns to 500 microns. In many instances, the micro LED pixels are individually addressable. The pixels can be embedded in a solid or a flexible substrate, which can be at least in part transparent. For example, the light emitting pixel arrays can be at least partially embedded in glass, ceramic, or polymeric materials.

As used herein, the terms "storage media," "computer-readable storage media," or "computer-readable storage medium" can refer to non-transitory storage media, such as a hard drive, a memory chip, and cache memory, and to transitory storage media, such as carrier waves or propagating signals.

Aspects of the system with adaptive light source and neuromorphic vision sensor can be embodied in various manners (e.g., as a method, a system, a computer program product, or one or more computer-readable storage media). Accordingly, aspects of the present disclosure can take the form of a hardware implementation, a software implementation (including firmware, resident software, or microcode) or an implementation combining software and hardware aspects that can generally be referred to herein as a "circuit," "module" or "system." Functions described in this disclosure can be implemented as an algorithm executed by one or more hardware processing units, e.g., one or more microprocessors of one or more computers. In various embodiments, different operations and portions of the operations of the methods described can be performed by different processing units. Furthermore, aspects of the present disclosure can take the form of a computer program product embodied in one or more computer readable media having computer readable program code embodied, e.g., encoded or stored, thereon. In various implementations, such a computer program can, for example, be downloaded (or updated) to existing devices and systems or be stored upon manufacturing of these devices and systems.

The detailed description presents various descriptions of specific implementations. The innovations described can be implemented in a multitude of different ways, for example, as defined and covered by the claims and/or select examples. In the description, reference is made to the drawings where like reference numerals can indicate identical or functionally similar elements. Elements illustrated in the drawings are not necessarily drawn to scale. Additionally, certain embodiments can include more elements than illustrated in a drawing and/or a subset of the elements illustrated in a drawing. Further, some embodiments can incorporate a suitable combination of features from two or more drawings.

The disclosure describes various illustrative implementations and examples for implementing the features and functionality of the present disclosure. While components, arrangements, and/or features are described in connection with various example implementations, these are merely examples to simplify the present disclosure and are not intended to be limiting. In the development of any actual implementation, numerous implementation-specific decisions can be made to achieve the developer's specific goals, including compliance with system, business, and/or legal constraints, which can vary from one implementation to another. Additionally, while such a development effort might be complex and time-consuming, it would be a routine undertaking for those of ordinary skill in the art having the benefit of this disclosure.

In the Specification, reference was made to the spatial relationships between various components and to the spatial orientation of various aspects of components as depicted in the attached drawings. The devices, components, members, and apparatuses described can be positioned in any orientation. Thus, the use of terms such as "above", "below", "upper", "lower", "top", "bottom", or other similar terms to describe a spatial relationship between various components or to describe the spatial orientation of aspects of such components, describes a relative relationship between the components or a spatial orientation of aspects of such components, respectively, as the components described can be oriented in any direction. When used to describe a range of dimensions or other characteristics (e.g., time, length, width, etc.) of an element, operations, and/or conditions, the phrase "between X and Y" represents a range that includes X and Y. The systems, methods and devices of this disclosure have several innovative aspects, no one of which is solely responsible for the attributes disclosed herein. Some objects or advantages might not be achieved by implementations described herein. Thus, for example, certain implementations can operate in a manner that achieves or optimizes one advantage or group of advantages as taught herein and not other objects or advantages as may be taught or suggested herein.

In one example implementation, any number of electrical circuits of the Figs. can be implemented on a board of an associated electronic device. The board can be a general circuit board that can hold various components of the internal electronic system of the electronic device and, further, provide connectors for other peripherals. More specifically, the board can provide the electrical connections by which other components of the system can communicate electrically. Any processors (inclusive of digital signal processors, microprocessors, supporting chipsets, etc.) and computer-readable non-transitory memory elements can be coupled to the board based on configurations, processing demands, computer designs, etc. Other components such as external storage, additional sensors, controllers for audio/video display, and peripheral devices can be attached to the board as plug-in cards, via cables, or integrated into the board itself. In various implementations, the functionalities described herein can be implemented in emulation form as software or firmware running within one or more configurable (e.g., programmable) elements arranged in a structure that supports these functions. The software or firmware providing the emulation can be provided on one or more non-transitory, computer-readable storage media including instructions to allow one or more processors to carry out those functionalities.

In another example implementation, the electrical circuits of the Figs. can be implemented as stand-alone modules (e.g., a device with associated components and circuitry configured to perform a specific application or function) or implemented as plug-in modules into application specific hardware of electronic devices. Implementations of the present disclosure can be readily included in a system-on-chip (SOC) package. An SOC represents an integrated circuit (IC) that integrates components of a computer or other electronic system into one chip. The SOC can contain digital, analog, mixed-signal, and often radio frequency functions that can be provided on one chip substrate. Other embodiments can include a multi-chip-module (MCM), with a plurality of separate ICs located within one electronic package and that interact through the electronic package. In various other implementations, the processors can be implemented in one or more silicon cores in Application Specific Integrated Circuits (ASICs), Field Programmable Gate Arrays (FPGAs), and other semiconductor chips.

The specifications, dimensions, and relationships outlined herein (e.g., the number of processors and logic operations) have been offered for non-limiting purposes of example and teaching. Such information can be varied considerably. For example, various modifications and changes can be made to arrangements of components. The description and drawings are, accordingly, to be regarded in an illustrative sense, not in a restrictive sense.

With the numerous examples provided herein, interaction was described in terms of two, three, four, or more electrical components for purposes of clarity and example. The system can be consolidated in any manner. Along similar design alternatives, the illustrated components, modules, and elements of the Figs. can be combined in various possible configurations that are clearly within the scope of this disclosure. In certain cases, it might be easier to describe one or more of the functionalities of a given set of flows by referencing a limited number of electrical elements. The electrical circuits of the Figs. and their teachings are readily scalable and can accommodate many components, as well as more complicated/sophisticated arrangements and configurations. Accordingly, the examples provided do not limit the scope or inhibit the teachings of the electrical circuits as potentially applied to a myriad of other architectures.

In this disclosure, references to various features (e.g., elements, structures, modules, components, steps, operations, characteristics, etc.) included in "one implementation", "example implementation", "an implementation", "another implementation", "some implementations", "various implementations", "other implementations", "alternative implementation", and the like are intended to mean that any such features are included in one or more implementations of the present disclosure and might or might not necessarily be combined in the same implementations.

Some operations can be deleted or omitted where appropriate, or these operations can be modified or changed considerably. In addition, the timing of these operations can be altered considerably. The preceding operational flows have been offered for purposes of example and discussion. Implementations described herein provide flexibility in that any suitable arrangements, chronologies, configurations, and timing mechanisms can be provided.

Modifications

In some implementations, the light source array controller is omitted as a separate structure and is incorporated within the host device system controller.

In implementations including a camera, the camera can be used to determine the brightness of the object.

The operations of algorithms (e.g., of FIGS. 4, 6, and 9-10) generally were described with reference to neuromorphic vision units. These operations can be performed jointly or exclusively elsewhere in the systems. For example, the host device system controllers can perform some or all of the operations of these algorithms.

In some implementations, the light source array 750 can emit a high, short, light pulse to fix a motion blur of a moving object, while keeping an exposure time of sensor system 720 long. Thus, the sensor system 720 can integrate light for a dark background, in an analogy to a xenon stroboscope.

This disclosure discusses changing the current, duration or width of a single pulse, or duty cycle of a PWM signal of a light source. In some implementations, these changes can adjust the color of the light emitted from the light source arrays. Such color adjustments can improve the sensitivity of sensors, such as cameras.

In some implementations, the system is included in an autonomous vehicle.

The position of the object can include the size of the object. That is, the position does not refer only to the center of the object.

EXAMPLES

Example 1 is an apparatus, comprising: a neuromorphic vision unit including a plurality of pixels configured to photoelectrically produce data based on light received from an object in a scene; an array including a plurality of light sources; and a controller configured to control the plurality of light sources at one of a plurality of granularities, at least in part based on the data.

Example 2 is the apparatus of Example 1, wherein the data from the scene indicates a motion of the object in the scene, and the one of the plurality of granularities is selected at least in part based on the motion.

Example 3 is the apparatus of any of Examples 1-2, wherein the controller is configured to control a current, width of a single pulse, or pulse-width modulation (PWM) signal of at least one of the plurality of light sources, at least in part based on the data from the scene.

Example 4 is the apparatus of any of Examples 1-3, further comprising: a sensor system including a plurality of sensor pixels configured to photoelectrically capture an image of the scene.

Example 5 is the apparatus of Example 4, wherein the controller is configured to determine different exposure settings of at least two of the plurality of sensor pixels, at least in part based on the data from the scene.

Example 6 is the apparatus of any of Examples 4-5, wherein the controller is configured to determine a global exposure time for the plurality of sensor pixels, at least in part based on the different exposure settings of the at least two of the plurality of sensor pixels.

Example 7 is the apparatus of any of Examples 4-6, wherein the controller is configured to produce a high-dynamic-range image, based on the exposure settings.

Example 8 is the apparatus of any of Examples 4-7, wherein the controller is configured to control an exposure time of the plurality of sensor pixels, based on an exposure time of the plurality of pixels of the neuromorphic vision unit.

Example 9 is the apparatus of any of Examples 4-8, further comprising: a display configured to display the image of the scene, wherein the controller is configured to freeze a frame of the image of the scene, at least in part based on the data.

Example 10 is the apparatus of any of Examples 1-9, wherein the light sources are LEDs, mini LEDs, segmented LEDs, micro LEDs or infrared LEDs.

Example 11 is the apparatus of any of Examples 1-10, wherein the controller is configured to determine different exposure settings of at least two of the plurality of pixels of the neuromorphic vision unit, at least in part based on the data from the scene.

Example 12 is a method, comprising: photoelectrically producing data, by a neuromorphic vision unit, based on light received from an object in a scene, the neuromorphic vision unit including a plurality of pixels; and controlling a plurality of light sources of an array at one of a plurality of granularities, at least in part based on the data.

Example 13 is the method of Example 12, wherein the data indicates a motion of the object in the scene, and the one of the plurality of granularities is selected at least in part based on the motion.

Example 14 is the method of any of Examples 12-13, further comprising: controlling a current, a width of a single pulse, or a pulse-width modulation (PWM) signal of at least one of the plurality of light sources, at least in part based on the data from the scene.

Example 15 is the method of any of Examples 12-14, further comprising: photoelectrically capturing an image of the scene, by a sensor system including a plurality of sensor pixels.

Example 16 is the method of Example 15, further comprising: determining different exposure settings of at least two of the plurality of sensor pixels, at least in part based on the data from the scene.

Example 17 is the method of any of Examples 15-16, further comprising: controlling an exposure time of the plurality of sensor pixels, based on an exposure time of the plurality of pixels of the neuromorphic vision unit.

Example 18 is the method of any of Examples 12-17, wherein the light sources are micro LEDs or infrared LEDs.

Example 19 is the method of any of Examples 12-18, further comprising: determining different exposure settings of at least two of the plurality of pixels of the neuromorphic vision unit, at least in part based on the data from the scene.

Example 20 is a non-transitory, computer-readable storage medium encoded with instructions that, when executed, cause a processing unit to perform a method comprising: receiving data from an imager unit indicating an object in a scene, the imager unit including a plurality of pixels; and controlling a plurality of light sources of an array at one of a plurality of granularities, at least in part based on the data.

The invention claimed is:

1. An apparatus, comprising:
an array including a plurality of light sources;
a neuromorphic vision unit including a plurality of pixels configured to photoelectrically produce data based on light received from an object in a scene, the data comprising values of one of a plurality of granularities of the plurality of light sources co-tuned with exposure settings of a corresponding region of the plurality of pixels;
and
a controller configured to receive the data and control the plurality of light sources at the one of a plurality of granularities, at least in part based on the data.

2. The apparatus of claim 1, wherein the data from the scene indicates a motion of the object in the scene, and the one of the plurality of granularities is selected at least in part based on the motion.

3. The apparatus of claim 1, wherein the controller is configured to control a current, width of a single pulse, or pulse-width modulation (PWM) signal of at least one of the plurality of light sources, at least in part based on the data from the scene.

4. The apparatus of claim 1, further comprising:
a sensor system including a plurality of sensor pixels configured to photoelectrically capture an image of the scene.

5. The apparatus of claim 4, wherein the controller is configured to determine different exposure settings of at least two of the plurality of sensor pixels, at least in part based on the data from the scene.

6. The apparatus of claim 1, wherein the controller is configured to produce a high-dynamic-range image, at least in part based on the data.

7. The apparatus of claim 5, wherein the controller is configured to produce a high-dynamic-range image, based on the exposure settings.

8. The apparatus of claim 4, wherein the controller is configured to control an exposure time of the plurality of sensor pixels, based on an exposure time of the plurality of pixels of the neuromorphic vision unit.

9. The apparatus of claim 4, further comprising:
a display configured to display the image of the scene, wherein the controller is configured to freeze a frame of the image of the scene, at least in part based on the data.

10. The apparatus of claim 1, wherein the light sources are micro LEDs configured to emit visible light.

11. The apparatus of claim 1, wherein the controller is configured to determine different exposure settings of at least two of the plurality of pixels of the neuromorphic vision unit, at least in part based on the data from the scene.

12. A method, comprising:
photoelectrically producing data, by a neuromorphic vision unit, based on light received from an object in a scene, the neuromorphic vision unit including a plurality of pixels, the data comprising values of one of a plurality of granularities of a plurality of light sources co-tuned with exposure settings of a corresponding region of the plurality of pixels, the plurality of light sources coupled with the neuromorphic vision unit; and
controlling a plurality of light sources of an array at one of a plurality of granularities, at least in part based on the data.

13. The method of claim 12, wherein the data indicates a motion of the object in the scene, and the one of the plurality of granularities is selected at least in part based on the motion.

14. The method of claim 12, further comprising:
controlling a current, a width of a single pulse, or a pulse-width modulation (PWM) signal of at least one of the plurality of light sources, at least in part based on the data from the scene.

15. The method of claim 12, further comprising:
photoelectrically capturing an image of the scene, by a sensor system including a plurality of sensor pixels.

16. The method of claim 15, further comprising:
determining different exposure settings of at least two of the plurality of sensor pixels, at least in part based on the data from the scene.

17. The method of claim 15, further comprising:
controlling an exposure time of the plurality of sensor pixels, based on an exposure time of the plurality of pixels of the neuromorphic vision unit.

18. The method of claim 12, wherein the light sources are micro LEDs or infrared LEDs.

19. The method of claim 12, further comprising:
determining different exposure settings of at least two of the plurality of pixels of the neuromorphic vision unit, at least in part based on the data from the scene.

20. An apparatus, comprising:
a neuromorphic vision unit including a plurality of pixels configured to photoelectrically produce data based on light received from an object in a scene;
an array including a plurality of light sources;
a sensor system including a plurality of sensor pixels configured to photoelectrically capture an image of the scene; and
a controller configured to:
control the plurality of light sources at one of a plurality of granularities, at least in part based on the data;
determine different exposure settings of at least two of the plurality of sensor pixels, at least in part based on the data from the scene; and
determine a global exposure time for the plurality of sensor pixels, at least in part based on the different exposure settings of the at least two of the plurality of sensor pixels.

* * * * *